(12) United States Patent
Billa et al.

(10) Patent No.: US 9,514,246 B2
(45) Date of Patent: *Dec. 6, 2016

(54) ANCHORED PATTERNS

(71) Applicant: Cavium, Inc., San Jose, CA (US)

(72) Inventors: Satyanarayana Lakshmipathi Billa, Sunnyvale, CA (US); Rajan Goyal, Saratoga, CA (US)

(73) Assignee: Cavium, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/632,448

(22) Filed: Feb. 26, 2015

(65) Prior Publication Data

US 2016/0070818 A1    Mar. 10, 2016

Related U.S. Application Data

(63) Continuation of application No. 13/168,323, filed on Jun. 24, 2011, now Pat. No. 8,990,259.

(51) Int. Cl.
*G06F 17/30* (2006.01)
*H04L 29/06* (2006.01)

(52) U.S. Cl.
CPC ... *G06F 17/30958* (2013.01); *G06F 17/30424* (2013.01); *H04L 69/22* (2013.01); *G06F 17/30327* (2013.01); *G06F 17/30961* (2013.01); *H04L 63/0245* (2013.01); *H04L 63/1416* (2013.01)

(58) Field of Classification Search
CPC .................. G06F 17/30327; G06F 17/30961; H04L 63/1416; H04L 63/0245; H04L 69/22
USPC ................................................ 707/794, 797
See application file for complete search history.

(56) References Cited

U.S. PATENT DOCUMENTS

| | | | |
|---|---|---|---|
| 7,046,848 | B1 | 5/2006 | Olcott |
| 7,370,361 | B2 | 5/2008 | de los Santos et al. |
| 7,594,081 | B2 | 9/2009 | Bouchard et al. |
| 7,613,926 | B2 | 11/2009 | Edery et al. |
| 7,634,408 | B1 | 12/2009 | Mohri |
| 7,636,717 | B1 | 12/2009 | Gupta et al. |
| 7,710,988 | B1 | 5/2010 | Tripathi et al. |
| 7,949,683 | B2 | 5/2011 | Goyal |

(Continued)

FOREIGN PATENT DOCUMENTS

| | | |
|---|---|---|
| WO | WO 2012/177736 A1 | 12/2012 |
| WO | WO 2012/177752 A1 | 12/2012 |

OTHER PUBLICATIONS

Richard N. Taylor et al., Structural Testing of Concurrent Programs, Mar. 1992, vol. 18, IEEE, 206-215.*
Aho, A.V., and Ullman, J. D., *Principles of Compiler Design*, (Addison-Wesley) (1977). ISBN 0-201-10073-8. See Chapter 3, pp. 73-124.

(Continued)

*Primary Examiner* — Jean B Fleurantin
(74) *Attorney, Agent, or Firm* — Hamilton, Brook, Smith & Reynolds, P.C.

(57) ABSTRACT

A method and apparatus relate to recognizing anchored patterns from an input stream. Patterns from a plurality of given patterns are marked as anchored patterns. An anchored state tree for the anchored patterns of the plurality of given patterns is built, including nodes representing a state of the anchored state tree. For each node of the anchored state tree, a failure value equivalent to a node representing a state in an unanchored state tree representing unanchored patterns of the plurality of given patterns is determined.

22 Claims, 27 Drawing Sheets

(56) References Cited

U.S. PATENT DOCUMENTS

| | | | |
|---|---|---|---|
| 8,176,085 B2* | 5/2012 | Della-Libera et al. | 707/797 |
| 8,180,803 B2 | 5/2012 | Goyal | |
| 8,301,788 B2 | 10/2012 | Bouchard et al. | |
| 8,392,590 B2 | 3/2013 | Bouchard et al. | |
| 8,543,528 B2 | 9/2013 | Lunteren | |
| 8,937,942 B1 | 1/2015 | Li et al. | |
| 8,990,259 B2 | 3/2015 | Billa | |
| 2004/0172234 A1 | 9/2004 | Dapp et al. | |
| 2004/0225999 A1 | 11/2004 | Nuss | |
| 2005/0028114 A1 | 2/2005 | Gould et al. | |
| 2005/0035784 A1 | 2/2005 | Gould et al. | |
| 2005/0177736 A1 | 8/2005 | de los Santos et al. | |
| 2005/0238010 A1 | 10/2005 | Panigrahy et al. | |
| 2005/0240999 A1 | 10/2005 | Rubin et al. | |
| 2006/0059165 A1 | 3/2006 | Bosloy et al. | |
| 2006/0059314 A1 | 3/2006 | Bouchard et al. | |
| 2006/0069872 A1 | 3/2006 | Bouchard et al. | |
| 2006/0075206 A1 | 4/2006 | Bouchard et al. | |
| 2008/0109431 A1 | 5/2008 | Kori | |
| 2008/0140600 A1 | 6/2008 | Pandya | |
| 2008/0271147 A1 | 10/2008 | Mohanan et al. | |
| 2009/0063825 A1 | 3/2009 | McMillen et al. | |
| 2009/0138440 A1 | 5/2009 | Goyal | |
| 2009/0138494 A1 | 5/2009 | Goyal | |
| 2010/0037056 A1 | 2/2010 | Follis et al. | |
| 2010/0094906 A1 | 4/2010 | Della-Libera et al. | |
| 2010/0114973 A1 | 5/2010 | Goyal | |
| 2010/0192225 A1 | 7/2010 | Ma et al. | |
| 2010/0199355 A1 | 8/2010 | Ouddan et al. | |
| 2011/0295779 A1 | 12/2011 | Chen et al. | |
| 2012/0017262 A1 | 1/2012 | Kapoor et al. | |
| 2012/0078832 A1 | 3/2012 | Lunteren | |
| 2012/0203718 A1* | 8/2012 | Biran et al. | 706/12 |
| 2012/0331007 A1 | 12/2012 | Billa et al. | |
| 2012/0331554 A1 | 12/2012 | Goyal et al. | |

OTHER PUBLICATIONS

Hoperoft, J.E. and Ullman, J.D., "Introduction to Automata Theory, Languages, and Computation," *Addison-Wesley Publishing*, Reading, Massachusetts (1979). ISBN 0-201-02988-X. (See chapter 2.).

Klarlund, N., "Progress Measures, Immediate Determinacy, and a Subset Construction for Tree Automata," *IEEE*, pp. 382-393 (1992).

"Notification of Transmittal of the International Search Report and the Written Opinion of the International Searching Authority, or the Declaration" from International Application No. PCT/US2012/043337 mailed on Oct. 19, 2012.

Rabin, M.O. and Scott, D., "Finite Automata and their Decision Problems," *IBM Journal of Research and Development*, 3(2): 114-125 (1959).

Sipser, M., "Introduction to the Theory of Computation," *PWS*, Boston (1997). ISBN 0-534-94728-X. (See section 1.2: Nondeterminism, pp. 47-63.).

Jiang, J. et al. "Pattern-Based DFA for Memory-Efficient Scalable Multiple Regular Expression Matching," in the proceedings of IEEE International Conference on Communications (ICC) 2010.

Tang, Y., "Independent Parallel Compact Finite Automatons for Accelerating Multi-String Matching," IEEE Conference on Communications (2010).

Sunitha, K.V.N., et al., "Formal Languages and Automata Theory," pp. 46-48 (2015).

Becchi, M., & Crowley, P. (Nov. 2008). Efficient regular expression evaluation: theory to practice. In Proceedings of the 4th ACM/IEEE Symposium on Architectures for Networking and Communications Systems (pp. 50-59). ACM.

H. Porter III, Lexical Analysis—Part 3, Portland State University Department of Computer Science, http://web.cecs.pdx.edu/~harry/compilers/slides/LexicalPart3.pdf, pp. 1-26 (2005).

Slavici, V. et al., Finding the Minimal DFA of Very Large Finite State Automata with an Application to Token Passing Networks, Mar. 29, 2011, Northeastern University, Boston, MA and University of St. Andrews, St. Andrews, Scotland, pp. 1-15.

* cited by examiner

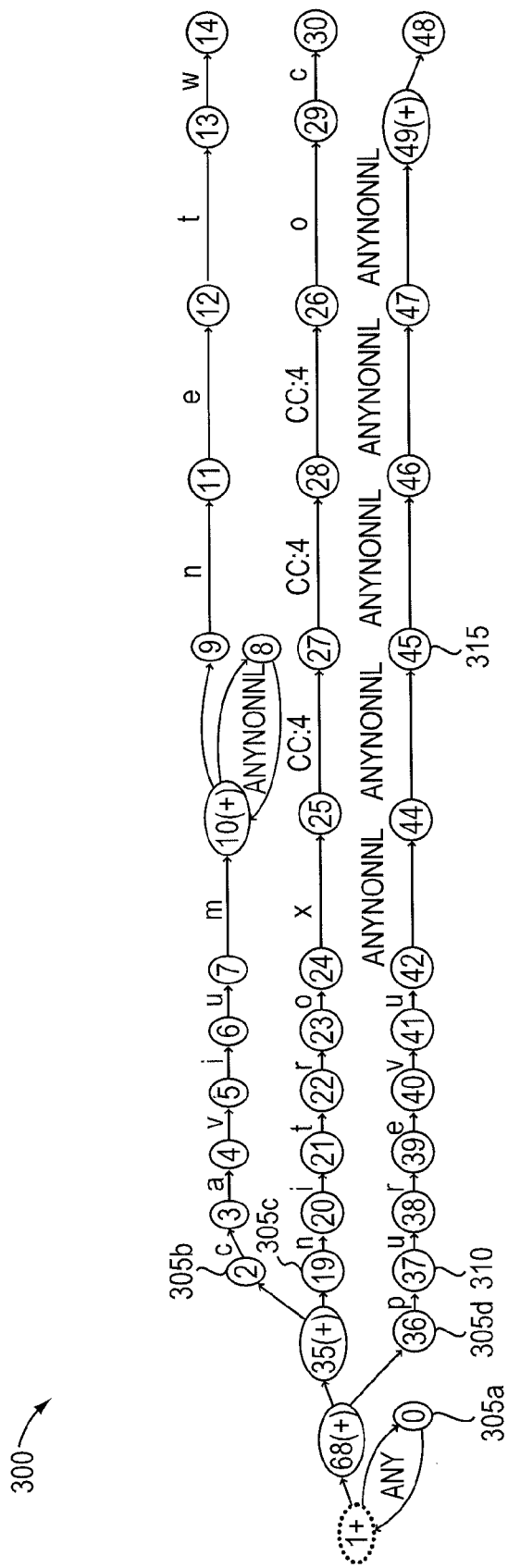
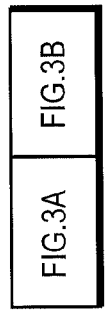
FIG. 3A
FIG. 3

NFA FOR .*a[^\n]
GRAPH SIZE OF 4 NODES

NFA FOR .*a[^\n][^\n]
GRAPH SIZE OF 5 NODES

NFA FOR .*a[^\n][^\n][^\n]
GRAPH SIZE OF 6 NODES

| PATTERN | NUMBER OF NFA NODES | NUMBER OF DFA NODES |
|---|---|---|
| .*a[^\n] | 4 | 4 |
| .*a[^\n][^\n] | 5 | 8 |
| .*a[^\n][^\n][^\n] | 6 | 16 |
| .*a[^\n][^\n][^\n][^\n] | 7 | 32 |
| .*a[^\n][^\n][^\n][^\n][^\n] | 8 | 64 |
| • | • | • |
| • | • | • |
| • | • | • |
| .*a[^\n]$_1$...[^\n]$_n$ | n+3 | $2^n$ |

FIG. 5G

| i    | 1 | 2 | 3 | 4 | 5 | 6 | 7 | 8 | 9 |
|------|---|---|---|---|---|---|---|---|---|
| $f(i)$ | 0 | 0 | 0 | 1 | 2 | 0 | 3 | 0 | 3 |

FAILURE FUNCTION

FIG. 11A

| i | output (i) |
|---|---|
| 2 | {he} |
| 5 | {she, he} |
| 7 | {his} |
| 9 | {hers} |

OUTPUT FUNCTION

FIG. 11B

| i | 10 | 11 | 12 | 13 | 14 | 15 | 16 | 17 | 18 | 19 |
|---|----|----|----|----|----|----|----|----|----|----|
| $f(i)$ | 0 | 0 | 0 | 0 | 0 | 0 | 1 | 2 | 3 | 0 |

FAILURE FUNCTION

FIG. 12A

| i | output (i) |
|---|---|
| 14 | {help} |
| 19 | {shell} |

OUTPUT FUNCTION

FIG. 12B

| i    | 10 | 11 | 12 | 13 | 14 | 15 | 16 | 17 | 18 | 19 |
|------|----|----|----|----|----|----|----|----|----|----|
| f(i) | 0  | 1  | 2  | 0  | 0  | 3  | 4  | 5  | 0  | 0  |

FAILURE FUNCTION

FIG. 13A

| i  | output (i)    |
|----|---------------|
| 12 | {he}          |
| 14 | { {@0} help } |
| 17 | {he, she}     |
| 19 | { {@0} shell }|

OUTPUT FUNCTION

FIG. 13B

ANCHORED PATTERNS

RELATED APPLICATION

This application is a continuation of U.S. application Ser. No. 13/168,323, filed Jun. 24, 2011, now U.S. Pat. No. 8,990,259. The entire teachings of the above application is incorporated herein by reference.

BACKGROUND

The Open Systems Interconnection (OSI) Reference Model defines seven network protocol layers (L1-L7) used to communicate over a transmission medium. The upper layers (L4-L7) represent end-to-end communications and the lower layers (L1-L3) represent local communications.

Networking application aware systems need to process, filter and switch a range of L3 to L7 network protocol layers, for example, L7 network protocol layers such as, HyperText Transfer Protocol (HTTP) and Simple Mail Transfer Protocol (SMTP), and L4 network protocol layers such as Transmission Control Protocol (TCP). In addition to processing the network protocol layers, the networking application aware systems need to simultaneously secure these protocols with access and content based security through L4-L7 network protocol layers including Firewall, Virtual Private Network (VPN), Secure Sockets Layer (SSL), Intrusion Detection System (IDS), Internet Protocol Security (IPSec), Anti-Virus (AV) and Anti-Spam functionality at wire-speed.

Network processors are available for high-throughput L2 and L3 network protocol processing, that is, performing packet processing to forward packets at wire-speed. Typically, a general purpose processor is used to process L4-L7 network protocols that require more intelligent processing. Although a general purpose processor can perform the compute intensive tasks, it does not provide sufficient performance to process the data so that it can be forwarded at wire-speed.

Content aware networking requires inspection of the contents of packets at "wire speed." The content may be analyzed to determine whether there has been a security breach or an intrusion. A large number of patterns and rules in the form of regular expressions are applied to ensure that all security breaches or intrusions are detected. A regular expression is a compact method for describing a pattern in a string of characters. The simplest pattern matched by a regular expression is a single character or string of characters, for example, /c/ or /cat/. The regular expression also includes operators and meta-characters that have a special meaning.

Through the use of meta-characters, the regular expression can be used for more complicated searches such as, "abc.*xyz". That is, find the string "abc", followed by the string "xyz", with an unlimited number of characters in-between "abc" and "xyz". Another example is the regular expression "abc . . . abc.*xyz;" that is, find the string "abc," followed two characters later by the string "abc" and an unlimited number of characters later by the string "xyz."

An Intrusion Detection System (IDS) application inspects the contents of all individual packets flowing through a network, and identifies suspicious patterns that may indicate an attempt to break into or compromise a system. One example of a suspicious pattern may be a particular text string in a packet followed 100 characters later by another particular text string.

Content searching is typically performed using a search algorithm such as, Deterministic Finite Automata (DFA) or Non-Deterministic Finite Automata (NFA) to process the regular expression.

SUMMARY

A method and corresponding apparatus relate to recognizing anchored patterns from an input stream. Patterns from a plurality of given patterns are marked as anchored patterns. An unanchored state tree for unanchored patterns of the plurality of given patterns is built, wherein the unanchored state tree includes nodes representing a state of the unanchored state tree. A separate anchored state tree for anchored patterns of the plurality of given patterns is built, wherein the anchored state tree includes nodes representing a state of the anchored state tree. For each node of the anchored state tree, a failure value equivalent to a node representing a state in an unanchored state tree representing unanchored patterns of the plurality of given patterns is determined.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 5A-G are NFA and DFA graphs and table illustrating the concept of graph explosion.

FIG. 11A illustrates failure values for each state of a pattern matching machine.

FIG. 11B illustrates the output function values for states of a pattern matching machine.

FIG. 12A illustrates failure values for each state of the state tree of FIG. 12.

FIG. 12B illustrates output function values for states 14 and 19 of the state tree of FIG. 12.

FIG. 13A illustrates failure values for each state of the state tree in FIG. 12.

FIG. 13B illustrates output function values for states 12, 14, 17, and 19 of the state tree of FIG. 12.

DETAILED DESCRIPTION

Before describing example embodiments of the present invention in detail, an example security application in which the embodiments may be implemented and typical processing using DFA and NFA are described immediately below to help the reader understand the inventive features of the present invention.

Regular expression (Regex) processing is becoming prevalent in many packet processing systems. Regex processing may be applied to traditional security systems (e.g., Intrusion Prevention Systems (IPS), Firewalls, and Unified Threat Management (UTM) devices), newer security systems (e.g., anti-malware, anti-spyware, zero day attach detection), emerging protocol/application recognition systems in wired/wireless networks for billing, Quality of Service (QoS), and network monitoring systems.

Regular expression processing may be broken down into two stages i) compiling signatures/patterns into binary data structures such as a DFA graph or NFA graph and ii) processing received packets against a compiled graph.

Storage versus Performance trade off requirements occurs at both stages of Regex Processing. Compilers allocated with large run time memory foot prints are able to compile patterns with greater speed and efficiency. Similarly, larger graphs or equivalent binary data structures used for packet inspection may give better packet inspection performance as opposed to compact graphs.

While in practice, it is expected for a compiler to compile rules very fast with as little memory foot print as possible. One reason is that patterns are updated in the field on network devices (e.g., routers, switches, UTM, etc.) while the network device is still running (e.g., inspecting/forwarding packets). Hence, there is a need to compile rules using limited memory in the embedded router device. Because the rules/patterns are used to prevent attacks on a system or stop traffic infected by viruses, the rules/patterns need to be applied as early as possible in order to optimize the security of the system. Thus, a compiler should be able to compile rules into binary data structures very fast.

General approaches compile new patterns or signatures into the graphs on a central server which then transmits the compiled graphs to a router. The router then inspects incoming packets against the received graphs by walking the packets through each graph. Efficient compilers require adequate memory resources. If a compiler does not have enough resources then the compiler performance is slow. Thus, naïve approaches do not compile new patterns or signatures on a router because routers generally do not have enough resources (i.e., random access memory (RAM) and CPU compute).

Embodiments of the present invention compile new patterns/signatures into graphs on a router while maintaining performance levels of a central server compiler.

Figure 1:
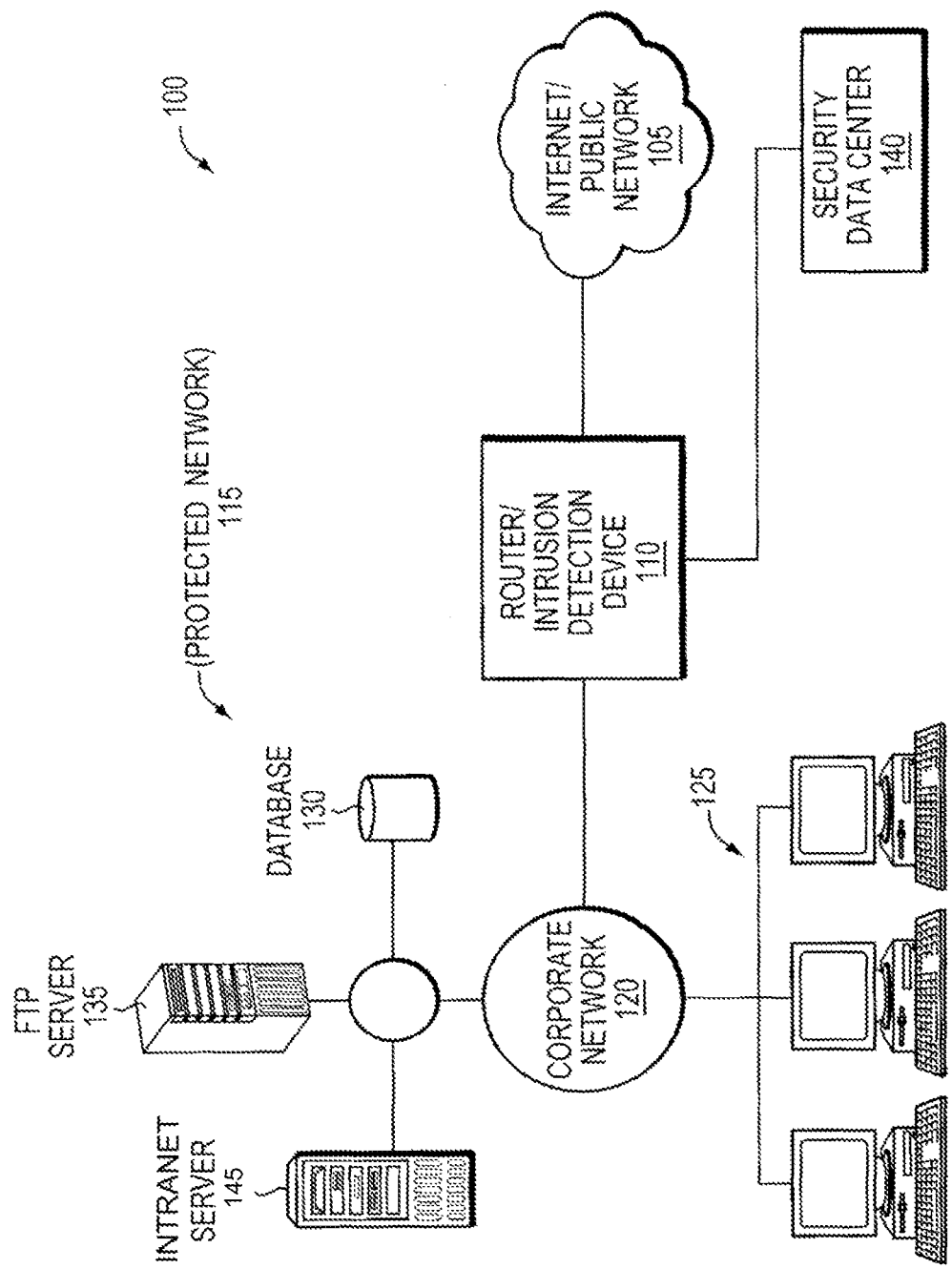
FIG. 1 is a block diagram illustrating a system in which a security appliance operated to protect a private network.

FIG. 1 is a block diagram illustrating a system 100 that includes a security appliance 110, protected network 115, and a public network 105. The public network 105 may comprise an unsecured wide-area network (WAN), such as the Internet, a wireless network, a local-area network, or another type of network. Protected network 115 may comprise a secured computer network such as a local-area network in an office or a data center. As illustrated, the local-area network may be a corporate network 120 including a plurality of work stations 125. The plurality of work stations 125 are operatively coupled to database 130, FTP (file transfer protocol) server 135, and intranet server 145.

In system 100, the security appliance 110 is connected to the public network 105 and protected network 115 such that network traffic flowing from public network 105 to protected network 115 flows first to the security appliance 110. The security appliance 110 may be a stand-alone network appliance (e.g., a router), a component of another network appliance (e.g., firewall appliance), a software module that executed on a network appliance, or another configuration. In general, security appliance inspects network traffic from public network 105 and determines whether the network traffic includes any computer security threats. A computer security threat is an attempt to gain access to sensitive information, an attempt to disrupt the operation of an organization, or another type of attack. Example computer security threats include computer viruses, spyware, rootkits, attempts to guess passwords, phishing emails, requests associated with a denial of service attach, and other types of attacks.

A computer security threat may be associated with one or more symbol patterns that identify the computer security threat, but do not identify innocuous data. A symbol pattern associated with a computer security threat is referred to herein as a "threat signature." For example, a particular virus may always include a sequence of instructions that, when executed, perform a malicious operation.

If security appliance 110 determines that a given stream of network traffic does not include any computer security threats, security appliance 110 may communicate the stream of network traffic to protected network 115. Otherwise, if security appliance 110 determines that the stream includes one or more computer security threats, security appliance 110 may drop the network traffic, log the network traffic, forward the traffic to a traffic analyzer for further analysis, and/or perform some other action with regard to the network traffic. In this way, security appliance 110 may prevent network traffic that includes computer security threats from reaching protected network 115.

In order to detect a security threat associated with one or more symbol patterns, the security appliance 110 receives given patterns or sequences of symbols from security datacenter 140 to be monitored in incoming data traffic from public network 105. Once the security appliance receives the given patterns to be monitored, the security appliance creates finite state machines for each given pattern to be monitored. The security appliance 110 then walks received data packets through finite state machines to determine whether an incoming data packet includes a potential security threat.

Figure 2:
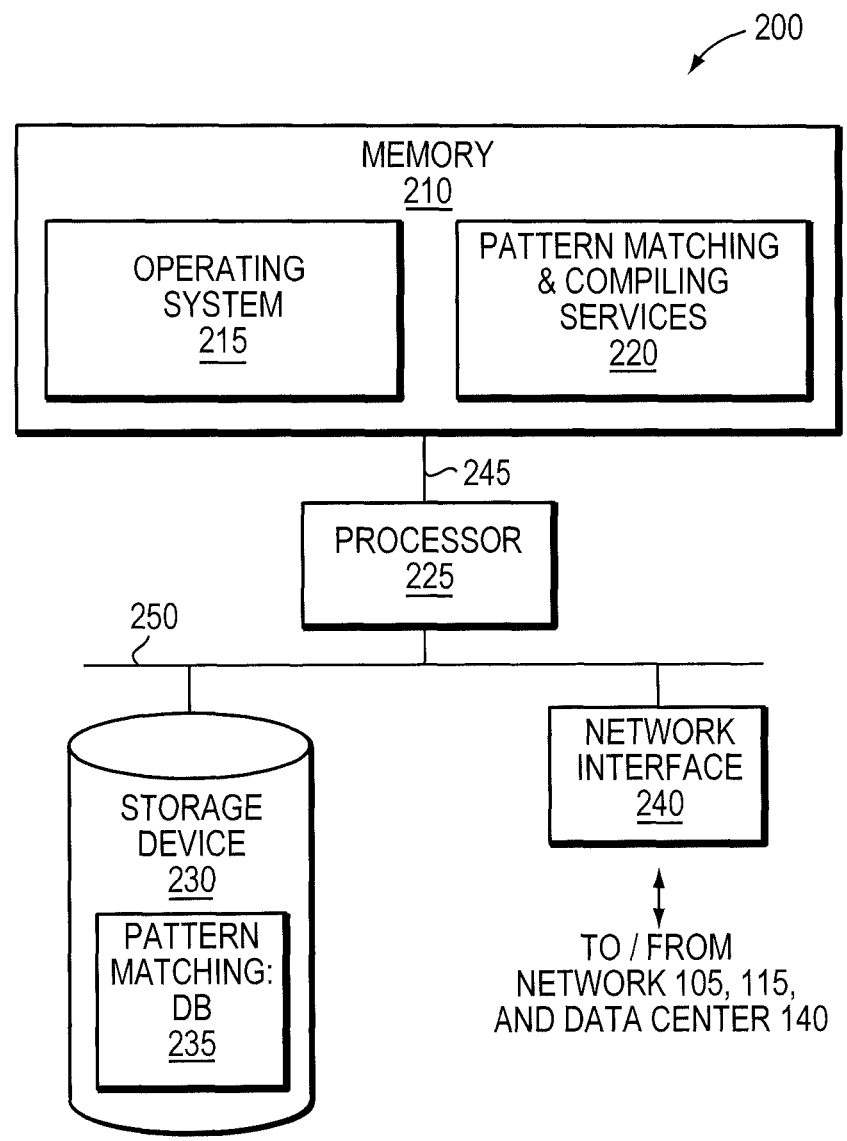
FIG. 2 is a block diagram of a security appliance that may be used with the present invention.

FIG. 2 is a high-level block diagram of an exemplary security appliance 200 that may be used with the present invention. Security appliance comprises a memory 210 coupled to a processor 225 via a memory bus 245 and, a storage device 230 and a network interface 240 coupled to the processor via an input/output (I/O) bus 250. It should be noted that the security appliance may include other devices, such as keyboards, display units and the like. The network interface 240 interfaces the security appliance with the secured network 115, public network 105, and security datacenter 140 and enables data (e.g., packets) to be transferred between the security appliance and other nodes in the system 100. To that end, network interface 240 comprises conventional circuitry that incorporates signal, electrical and mechanical characteristics, and interchange circuits, needed to interface with the physical media of system 100 and protocols running over that media.

The memory 210 is a computer-readable medium implemented as a RAM comprising RAM devices, such as DRAM devices and/or flash memory devices. Memory 210 contains various software and data structures used by the processor 225 including software and data structures that implement aspects of the present invention. Specifically, memory 210 includes an operating system 215 and pattern matching/compiling services 220. The operating system 215 functionally organizes the security appliance 200 by invoking operations in support of software processes and services executing on security appliance 200, such as pattern matching/compiling services 220. Pattern matching/compiling services 220, as will be described below, comprises computer-executable instructions to compile finite state machine graphs from a given patterns and/or walk incoming data packets through the compiled graphs.

Storage device 230 is a conventional storage device (e.g., disk or more likely DRAM) that comprises pattern matching database (DB) 235 which is a data structure that is configured to hold various information used to compile finite state machines from a given pattern. Information may include signature patterns, finite state machine graphs (e.g., DFA graphs and NFA graphs), epsilon closure (EC) cache tables, and DFA state hash tables.

Typically, content aware application processing uses either a deterministic finite automata (DFA) or a non-deterministic finite automata (NFA) to recognize a pattern in the content of a received packet. The DFA and NFA are both finite state machines, that is, models of computation each including a set of states, a start-state, an input alphabet (set of all possible symbols) and a transition function. Computation begins in the start-state and changes to new states dependent on the transition function.

The pattern is commonly expressed using a regular expression that includes atomic elements, for example, normal text characters such as, A-Z, 0-9 and meta-characters such as, *, ^ and |. The atomic elements of a regular expression are the symbols (single characters) to be matched. These are combined with meta-characters that allow concatenation (+) alternation (|), and Kleene-star (*). The meta-character for concatenation is used to create multiple character matching patterns from a single character (or sub-strings) while the meta-character for alternation (|) is used to create a regular expression that can match any of two or more sub-strings. The meta-character Kleene-star (*) allows a pattern to match any number, including no occurrences of the preceding character or string of characters. Combining different operators and single characters allows complex expressions to be constructed. For example, the expression (th(is|at)*) will match the following character strings: th, this, that, thisis, thisat, thatis, or thatat.

The character class construct [ . . . ] allows listing of a list of characters to search for, e.g. gr[ea]y looks for both grey and gray. A dash indicates a range of characters, for example, [A-Z]. The meta-character "." matches any one character.

The input to the DFA or NFA state machine is typically a string of (8-bit) bytes, that is, the alphabet is a single byte (one character or symbol). Each byte in the input stream results in a transition from one state to another state.

The states and the transition functions of the DFA or NFA state machine can be represented by a graph, where each node in the graph represents a state and arcs in the graph represent state transitions. The current state of the state machine is represented by a node identifier that selects a particular graph node.

Using DFA to process a regular expression and to find a pattern or patterns described by a regular expression in an input stream of characters is characterized by:

1) Deterministic run time performance: A next state of a DFA can be determined from an input character (or symbol) and a current state of the DFA. In other words, there is only one state transition per DFA state. As such, run time performance of the DFA is said to be deterministic and the behavior can be completely predicted from the input.

2) Smaller per flow context (e.g., state or node pointer) required to support matches across multiple packets: In a search for a pattern in an input that spans several packets making up a flow, the search may stop at one packet and then resume at another packet. Generally, determining which state to resume the search requires a tracking, remember or otherwise storing (e.g., as state pointers) all states gone through thus far when the search stopped. In DFA, however, only the state at which a search stopped needs to be remembered in order to resume the search. As such, it can be said that a DFA is characterized as requiring smaller per flow context to support pattern matching across multiple input packets e.g., on the order of several bytes to store a state or node pointer.

3) A graph in which the number of nodes (or graph size) grows exponentially with the size of a pattern.

In contrast, using NFA to process a regular expression and to find a pattern(s) described by the regular expression in an input stream of characters is characterized by:

1) Non-deterministic run time performance: Given an input character (or symbol) and a current state of the NFA, it is possible there are more than one next states of the NFA to which to transition. In other words, a next state of the NFA cannot be determined from the input and the current state of the NFA. As such, run time performance of the NFA is said to be non-deterministic and the behavior cannot be completely predicted from the input.

2) Larger per flow context (e.g., state or node pointer) required to support match across packets: As described previously, pattern matching across multiple input packets, where a search stops at one packet and then resumes at another, requires tracking all states gone through thus far when the search stopped. In NFA, as more of the input is matched, the greater the number of states that are gone through and need to be tracked. As such, it can be said that a NFA is characterized as requiring larger per flow context to support pattern matching across multiple input packets when compared to DFA.

3) A graph in which the number of nodes (or graph size) grows linearly with the size of a pattern.

The DFA and NFA characteristics mentioned above are discussed further in reference to FIGS. 3, 4, and 5A-G. It should be noted that for all DFA graphs shown in the figures, for brevity sake, arcs (state transitions) to node (state) 0 are not shown and arcs that point to the same node as pointed to by node 0 for the same character are also not shown.

Figure 3B:
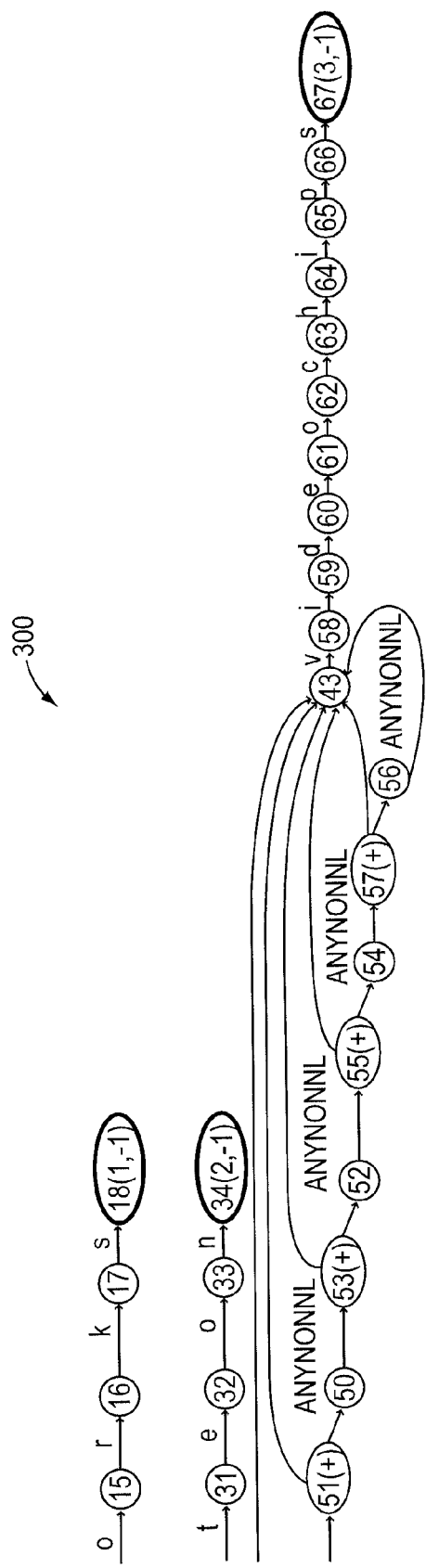
FIG. 3 is a NFA graph of an example NFA split across FIG. 3A and FIG. 3B.
Figures 4, 4A:
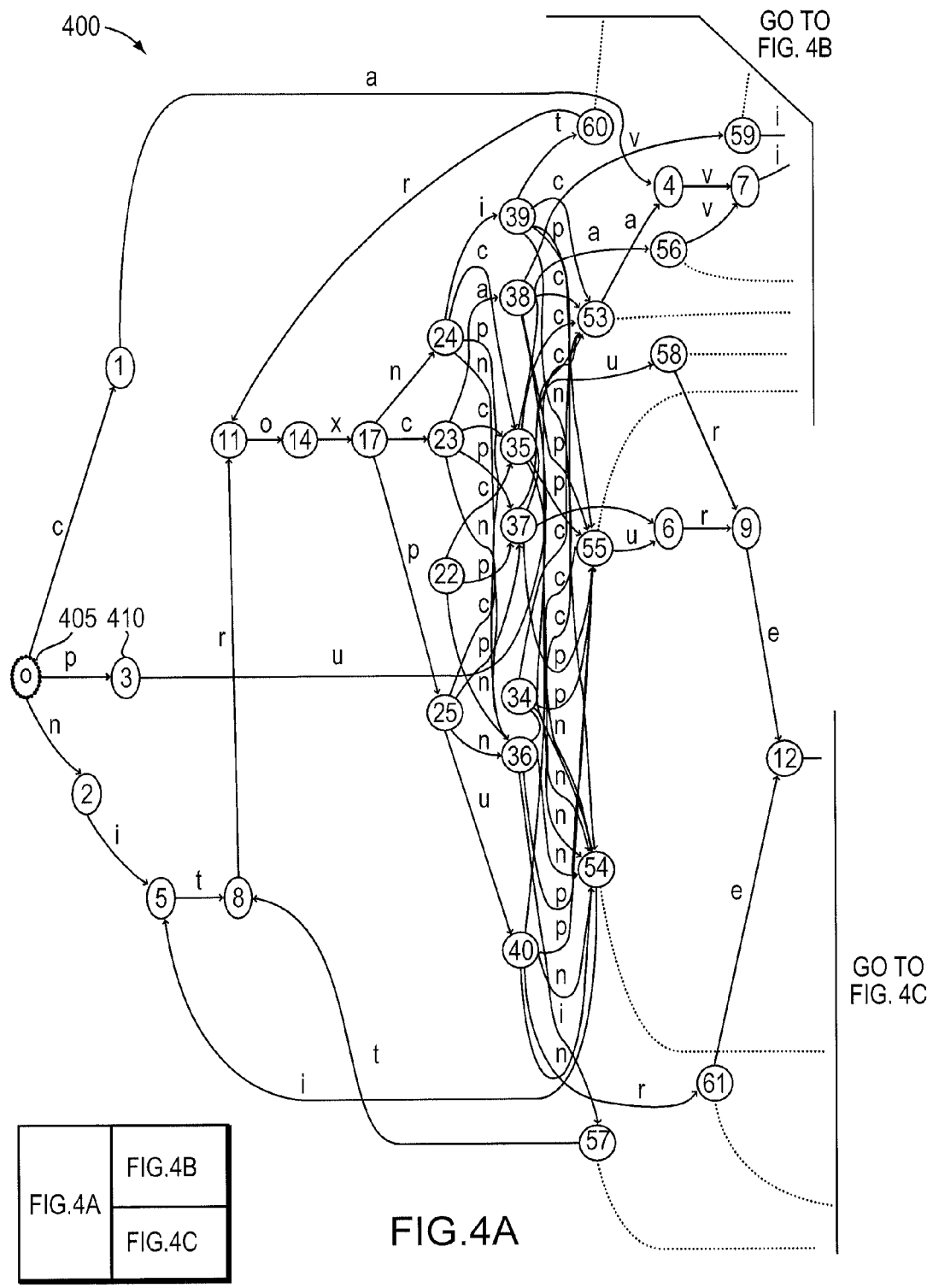
FIG. 4 is a DFA graph of an example DFA split across FIG. 4A, FIG. 4B, and FIG. 4C.
Figure 4B:
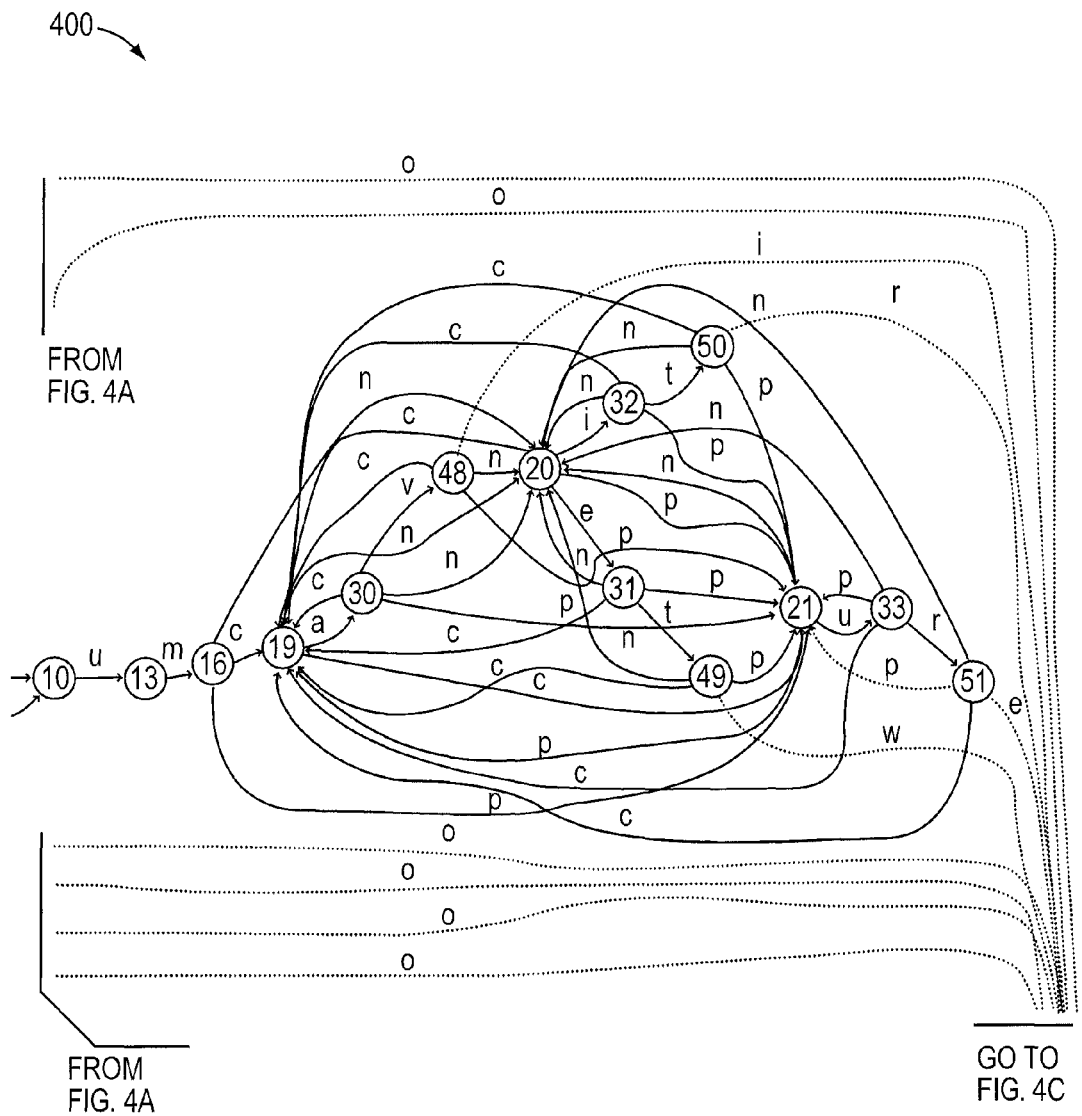
Figure 4C:
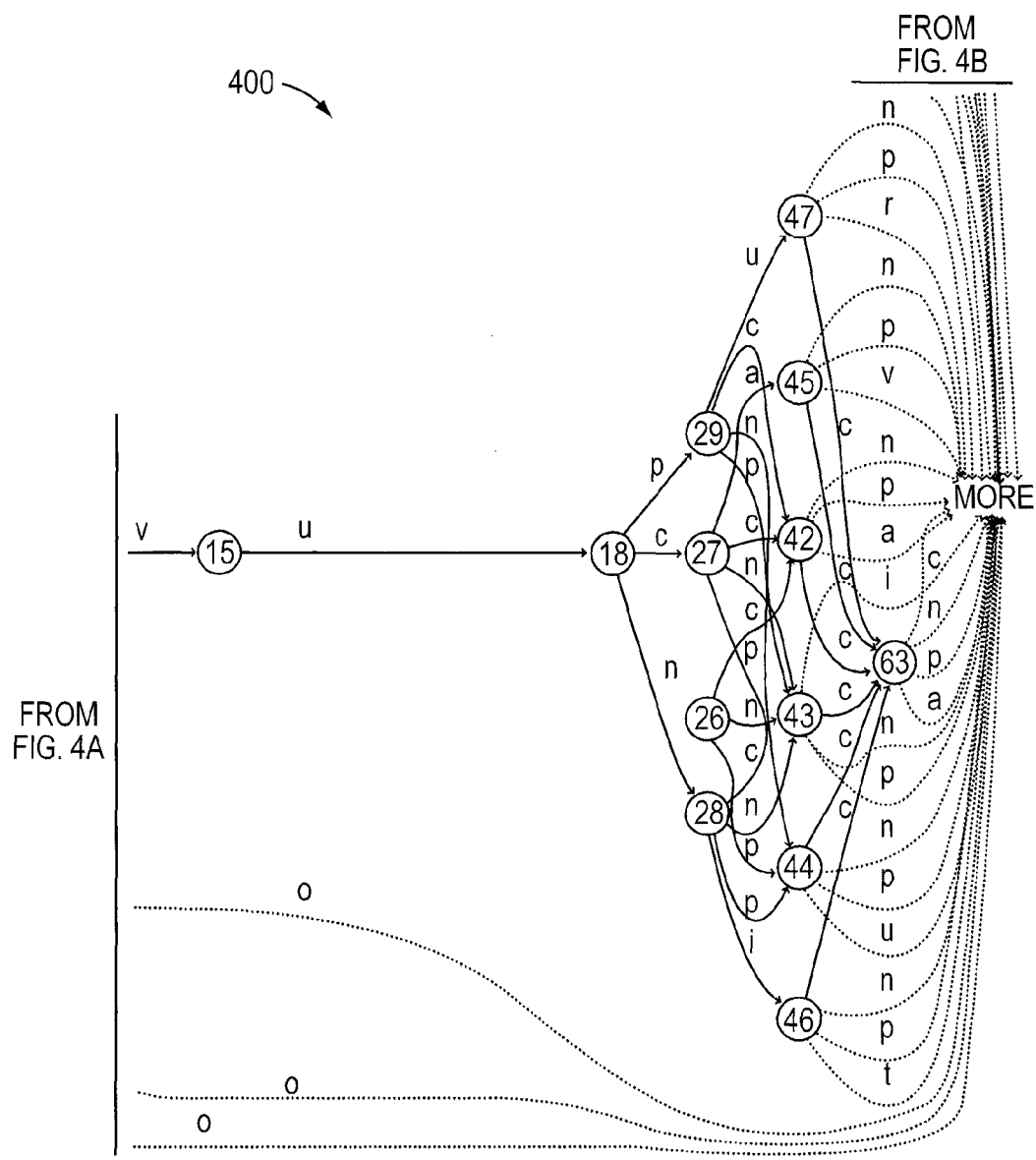

FIG. 3 shows a NFA graph 300 of an example NFA for searching for patterns "cavium.*networks," "nitrox [^\r\n\t\v\s]{3}octeon," and "purevu.{5,10}videochips." FIG. 4 shows a DFA graph 400 of an example DFA for searching for the same set of patterns. As mentioned above, it should be noted that the DFA graph 400 and other DFA graphs provided herein are "simplified" for drawing purposes. Arcs to node 0, representing state transitions to DFA state 0, are not shown in the figures. Arcs pointing to the same node as pointed to by node 0 for the same character are also not shown in the figures.

For the same set of patterns, the NFA graph 300 of FIG. 3 has 69 nodes, representing 69 states, while the DFA graph 400 of FIG. 4 has 931 nodes (only a portion of which is shown in FIG. 4), representing 931 states. As shown, for a given pattern or patterns, a number of DFA states may be larger than a number of NFA states, typically on the order of several hundred or thousand more states. This is an example of "graph explosion," which is a hallmark characteristic of DFA.

Figure 5A:
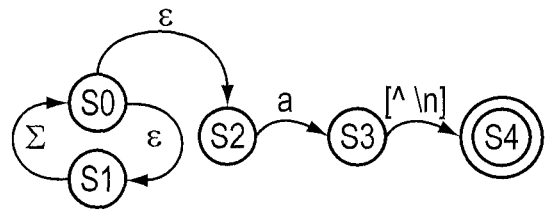
Figure 5B:
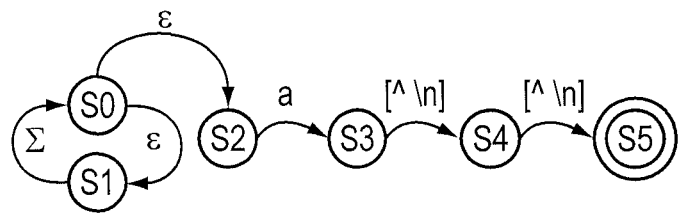
Figure 5C:
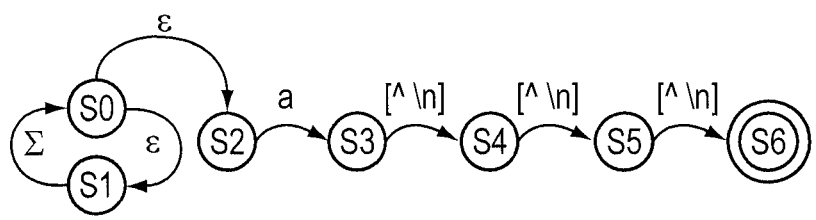
Figure 5D:
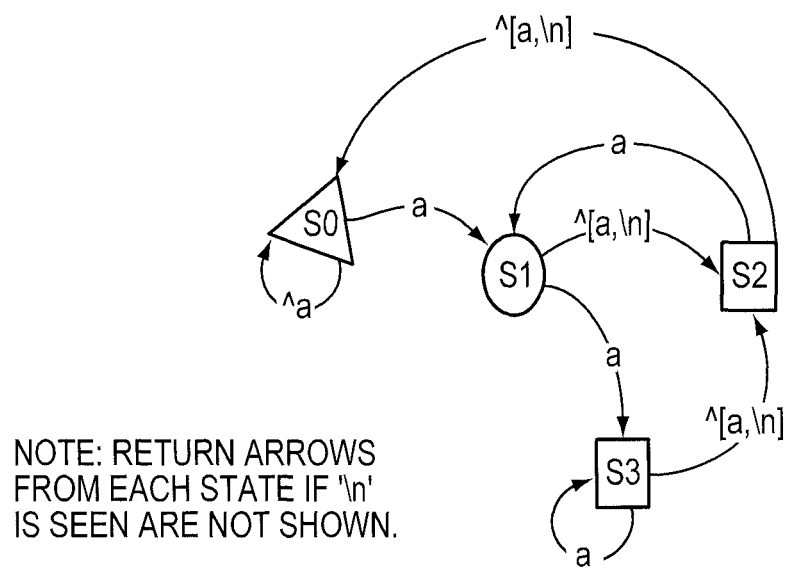
Figure 5E:
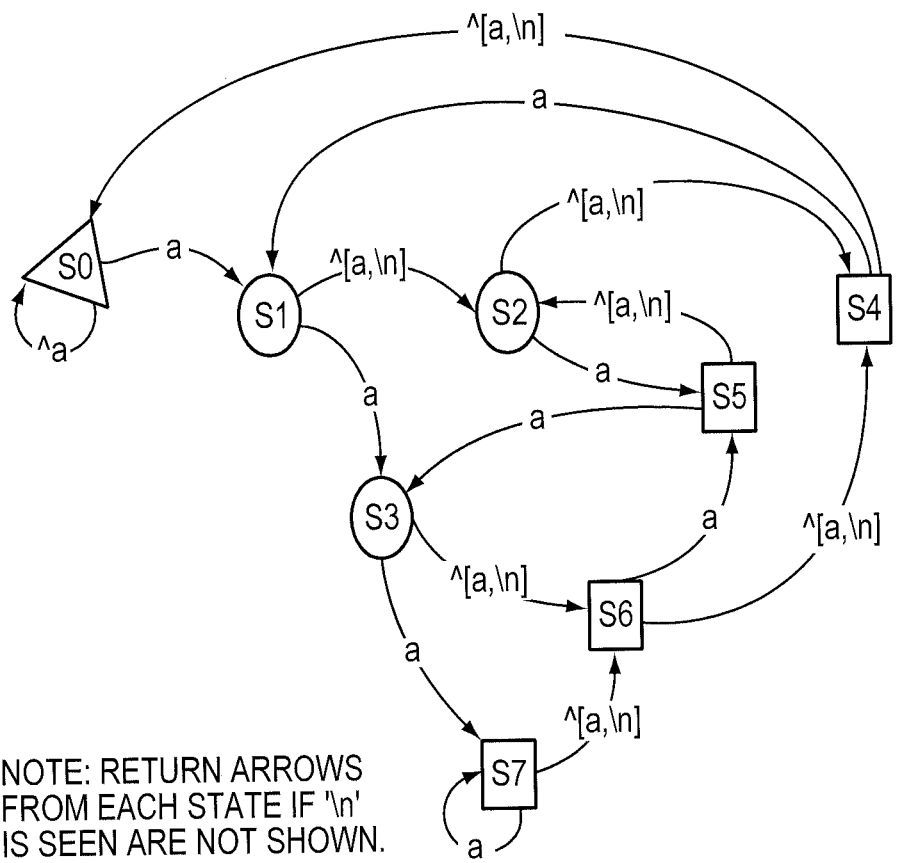
Figure 5F:
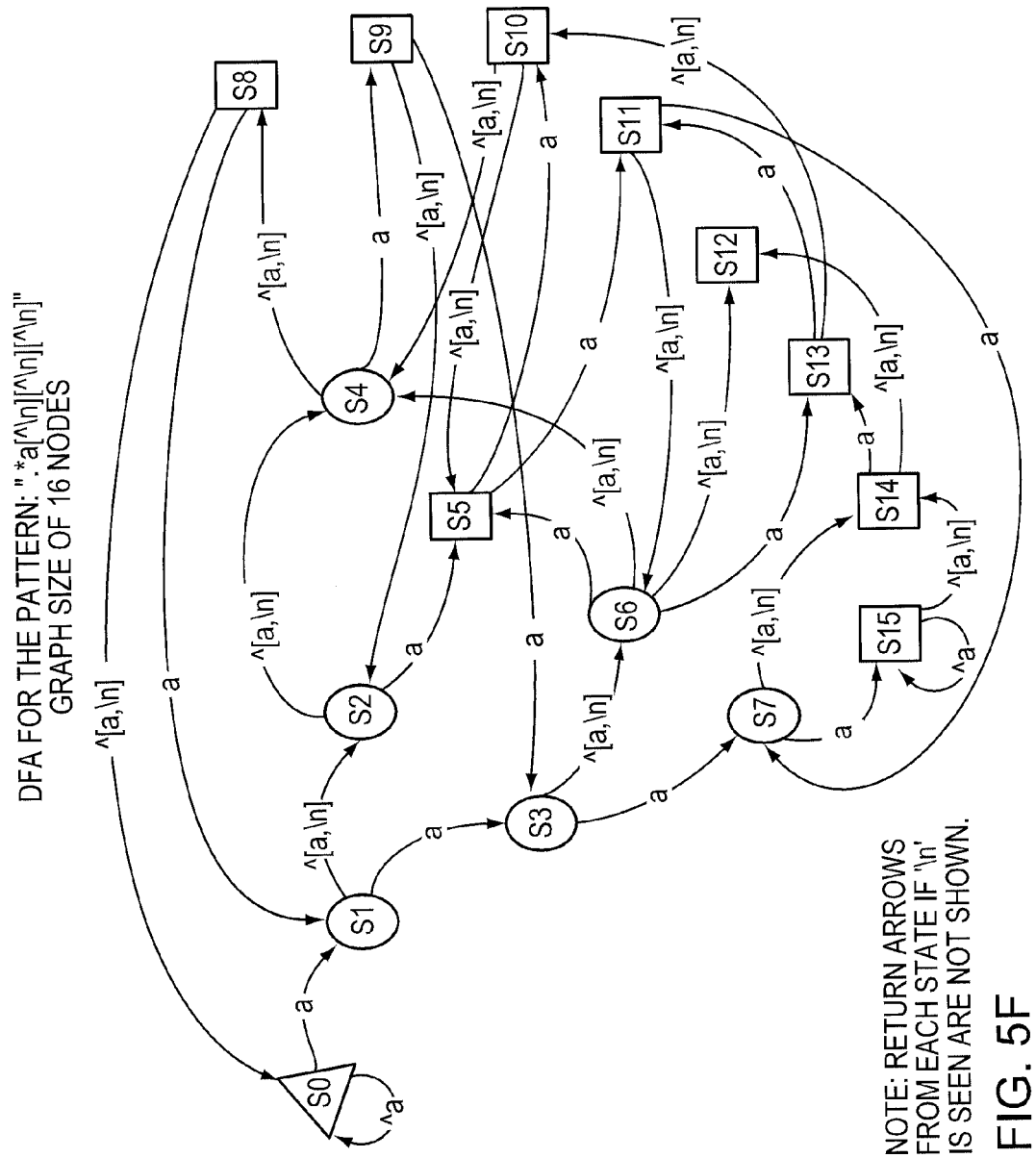

To further describe the concept of "graph explosion," consider FIGS. 5A, 5B, and 5C showing NFA graphs for patterns ".*a[^\n]," ".*a[^\n] [^\n]," ".*a[^\n] [^\n] [^\n]," respectively, and FIGS. 5D, 5E, and 5F showing DFA graphs for the same patterns. As shown in FIGS. 5A-5F and summarized by the table of FIG. 5G, for some patterns, NFA can grow linearly while DFA can grow exponentially resulting in a graph explosion.

Returning to FIG. 3, using the NFA represented by the NFA graph 300 to search for the patterns in input stream "purevuchips are video chips," NFA processing or matching begins at NFA start-states 0, 2, 19, and 36, represented by nodes 305a-d and written in shorthand as, NFA START STATES={0, 2, 19, 36}. On character 'p' of the input stream, the NFA transitions to state 37 (represented by node 310) and tracks states 0, 2, and 19 (written in shorthand as on 'p'={0, 2, 19, 37}) and continues as follows:
on 'u'={0, 2, 19, 38}
on 'r'={0, 2, 19, 39}
on 'e'={0, 2, 19, 40}
on 'v'={0, 2, 19, 41}
on 'u'={0, 2, 19, 42}
on 'c'={0, 2, 19, 44}
on 'h'={0, 2, 19, 45}
. . .
. . . etc.

Using the DFA represented by the DFA graph 400 of FIG. 4 to search for the same patterns in the same input, the DFA matching begins at DFA start-state 0 represented by node 405 and written in shorthand as DFA START STATE={0}. On character 'p' of the input stream, the DFA transitions to state 3, represented by node 410 and written in shorthand as on 'p'={3} and continues as follows:
on 'u'={6}
on 'r'={9}
on 'e'={12}
on 'v'={15}
on 'u'={18}
on 'c'={27}
on 'h'={41}
. . .
. . . etc.

As shown in the example above, in NFA, there are least n+1 number of NFA states to track, where n is the number of patterns to search (e.g., with 3 patterns to search for there are at least 4 states to track). In contrast, in DFA, there is only one state to track per input character. Now assume for illustration purposes that the input stream or flow "purevuchips are video chips," spans several packets with a first packet ending with "h" of "purevuchips" and a second packet starting with "i" of "purevuchips." In NFA, a search stops on "h" (end of the first packet) with four states to track (viz., states 0, 2, 19, and 45). To resume the search on "i" (start of the second packet) requires remembering these four states. In contrast, in DFA, a search stops on "h" (end of the first packet) with one state being tracked (viz., state 41). To resume the search on "i" (start of the second packet) requires remembering this one state. This example shows that in NFA, the per flow context required to support matching across multiple packets is four states (e.g., by storing four state pointers), while in DFA, the per flow context is one state. Therefore, NFA requires a per flow context larger than the per flow context required for a DFA of the same patterns. Likewise, DFA requires a per flow context smaller than the per flow context required for a NFA of the same patterns.

For every non-deterministic finite automata, there exists an equivalent deterministic finite automata. The equivalence between the two is defined in terms of language acceptance. Because an NFA is a finite automata in which zero, one, or more transitions on an input symbol is permitted, an equivalent DFA can be constructed that simulates all the moves of the NFA on a particular input symbol in parallel.

Since the DFA equivalent of the NFA simulates (parallels) the moves of the NFA, every state of a DFA is a combination of one or more states of the NFA. Hence, every state of a DFA will be represented by some subset of the set of states of the NFA; and therefore, the transformation from NFA to DFA is normally called the "construction" subset. Therefore, if a given NFA has n states, then the equivalent DFA may have $2^n$ number of states, with the initial state corresponding to the subset $\{q_0\}$. Therefore, the transformation from NFA to DFA involves finding all possible subsets of the set states of the NFA, considering each subset to be a state of a DFA, and then finding the transition from it on every input symbol.

Conversion of NFAs to DFAs occur because processing of NFA graphs by a computer system is difficult due to multiple possible transitions of an NFA, as shown above.

Figure 6A:
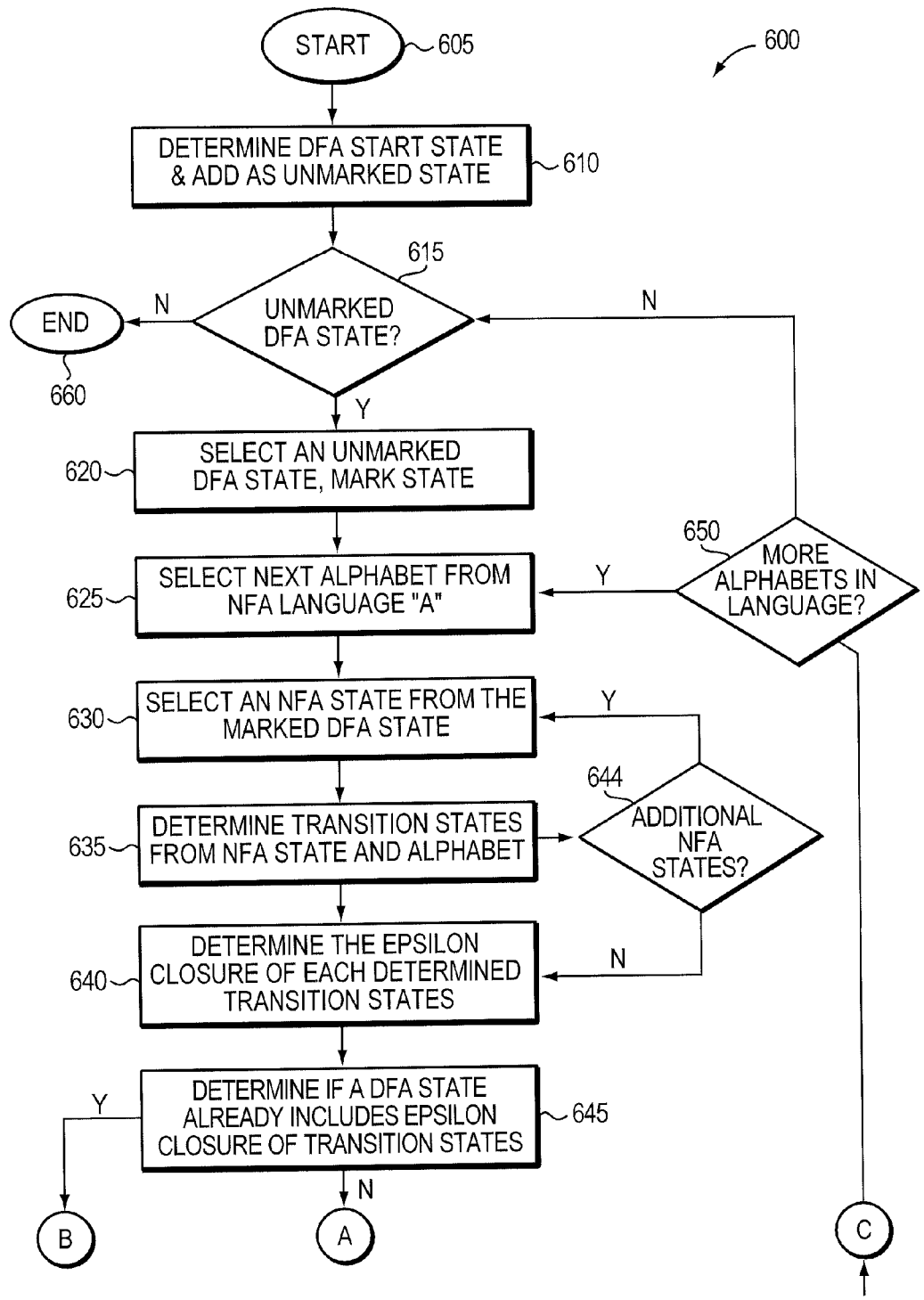
FIGS. 6A-B are flow diagrams of a method of converting an NFA graph to a DFA graph.
Figure 6B:
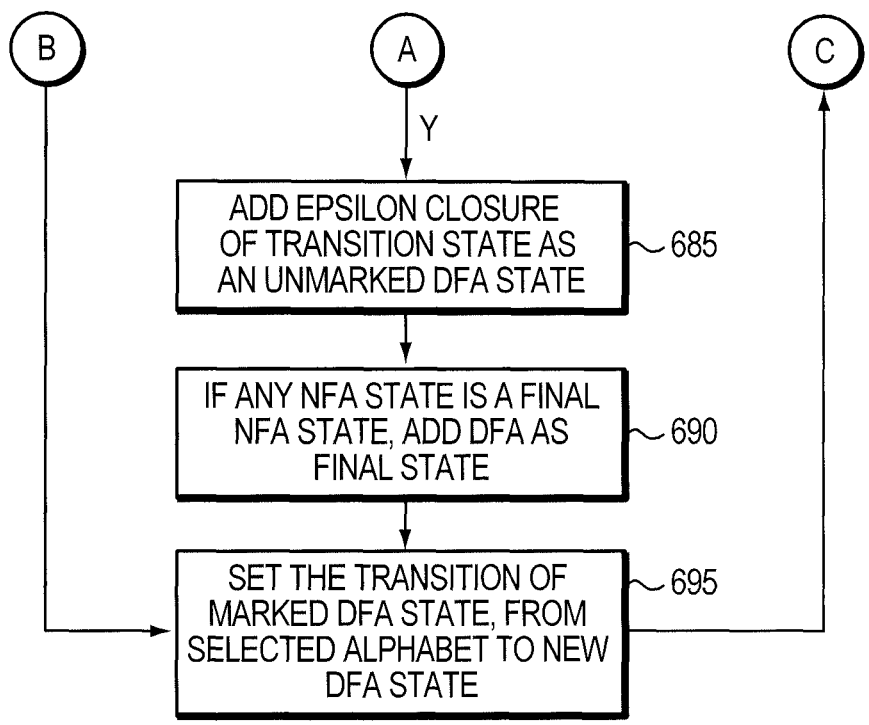

FIGS. 6A-B are flow diagrams of a method 600 for converting an NFA graph to a DFA graph. The method 600 begins at 605. At this stage, the set of DFA states "Sd" is null. At 610, a start state of the DFA is determined and added to the set of DFA states "Sd" as an unmarked state. The start state of the DFA is determined as the epsilon closure of the start state of the NFA graph. The method of determining the epsilon closure of a set of NFA states is further described below in reference to FIG. 7.

At 615, it is determined if the set of DFA states "Sd" includes an unmarked DFA state. If an unmarked DFA state of the set of DFA states "Sd" exists, at 620, unmarked state 'S' is selected and marked. At 625, an alphabet (e.g., letter) of a language 'A' recognized by the NFA graph is selected. At step 630, an NFA state 's' of the DFA state 'S' is selected. Additionally, before step 630, a data structure "St" for holding a set of NFA states is set to 'NULL'. At 635, a transition function "TTn=(s,a)" is applied to the NFA state 's' using letter 'a'. The transition function determines all NFA states reached from NFA state 's' if an input of 'a' is received. The determined NFA states are then added to the data structure "St". At 644, it is determined if the DFA state 'S' includes additional NFA states. If so, the method repeats steps 630 and 635 until all NFA states 's' of the DFA state 'S' have been processed. If all NFA states have been processed, the method continues at step 640. At 640, the Epsilon Closure of all NFA states 's' in the data structure 'St' is determined and added to the data structure 'St.'

At step 645, the data structure 'St' is compared with all existing DFA states 'S' to determine if a DFA state 'S' already includes all the NFA states 's' in data structure 'St'. Current approaches store each NFA state 's' associated with each DFA state 'S' in a data structure. In order to determine whether the NFA states 's' in the data structure 'St' are already associated with a DFA state 'S,' each NFA state 's' of data structure 'St' must be compared with each NFA state 's' for each DFA state 'S.' Therefore, such a comparison requires a significant amount of time and memory.

Table 1 below illustrates an example DFA states table that associates DFA state numbers to a set of NFA states. The set of NFA states may be stored in a data structure for each DFA state number, as described above.

TABLE 1

| DFA STATE NUMBER | SET OF NFA STATES |
|---|---|
| 0 | {0, 1, 2, 3, 4} |
| 1 | {0, 5, 6, 7} |
| 2 | {8, 9, 2, 3} |
| ... | ... |
| ... | ... |

For example, depending on an implementation of a data structure (containing DFA state and its corresponding set of NFA states), run time of the operation at step 645 is captured below in reference to Table 2. Table 2 lists the storage and maintenance cost of example data structure implementations. The comments column of Table 2 provides a description of each example data structure. For each data structure, assume there are 'N' DFA states and further assume that each DFA state represents, on average, 'M' NFA states.

TABLE 2

| Run time | Storage | Maintenance of data structure (insert of NFA state) | Comments |
|---|---|---|---|
| $O(N*M^2)$ | $O(N*M)$ | O (1) | Each set of NFA states (associated with DFA state) is stored as linear array containing NFA state numbers. |
| $O(N*M)$ | O(N*max number of NFA states/8) | O (1) | Each DFA state has bitmap of size equal to max number of NFA states in system. Separate bit to represent each NFA state. Corresponding bit is turned ON, if DFA state has that NFA state. |
| $O(N*\log M)$ | $O(N*k*M)$, where k is constant cost of tree pointers etc. | O (log M) | Each set of NFA states (associated with DFA state) is stored as tree containing NFA state numbers. |

Continuing with FIGS. 6A-B, if a DFA state 'S' already includes all the NFA states 's' of data structure 'St,' the method moves to step 695. If not, the method moves to step 685. At 685, the NFA states 's' in data structure 'St' are added to the set of DFA states 'Sd' as a new DFA state 'D'. At 690, it is determined whether any of the NFA states 's' belongs to a set of final states of the NFA graph. If so, the new DFA state is determined to be a final accepting state of the DFA graph. At 695, the transition from marked DFA state 'S' with input 'a' is set to be the new DFA state 'D.'

Figure 7:
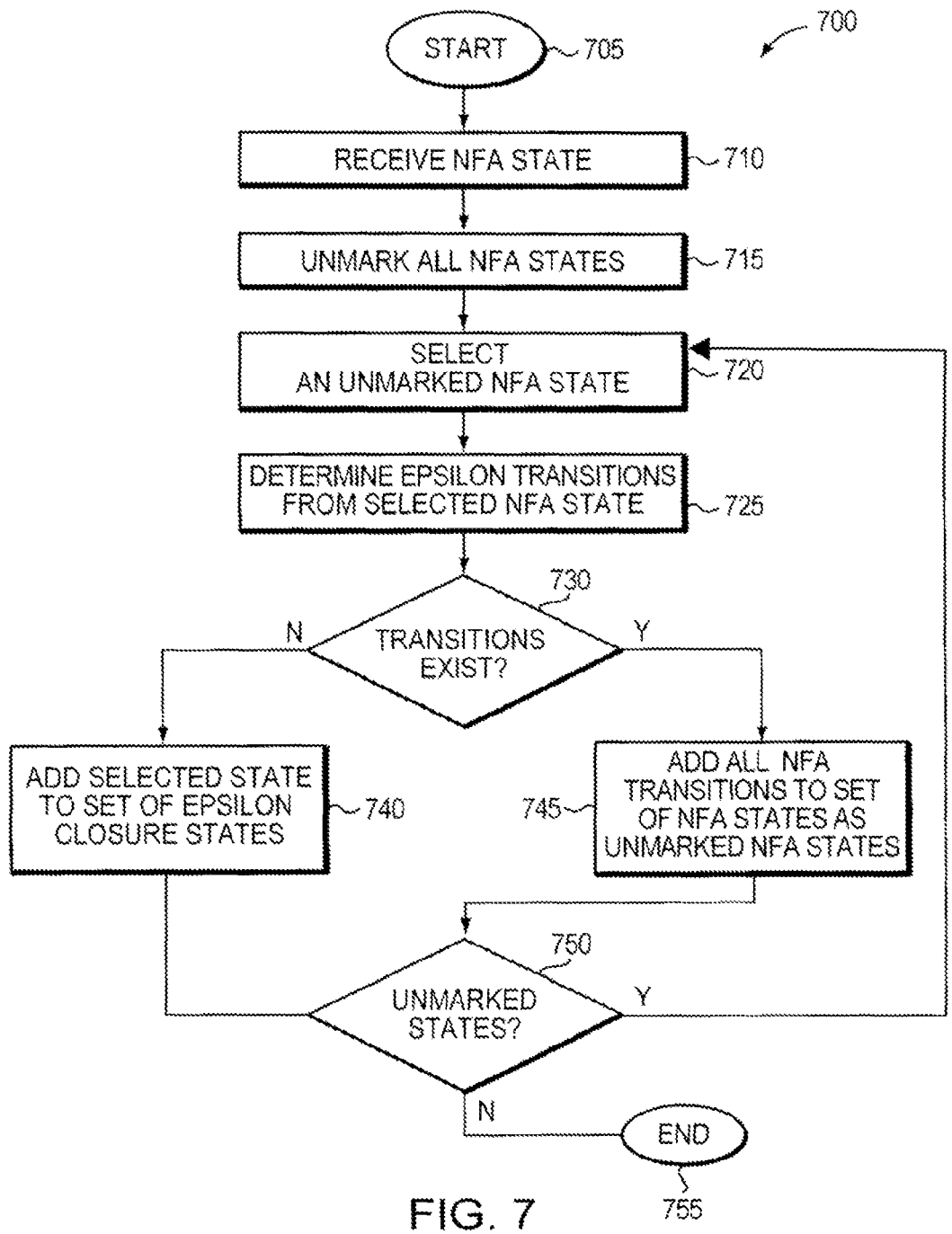
FIG. 7 is a flow diagram of a method for determining an epsilon closure for a state in an NFA graph.

FIG. 7 is flow diagram of a method 700 for determining an epsilon closure for any given NFA state 's' of a NFA graph. The method 700 begins at step 705. At 710, an epsilon closure function receives an NFA state 's' to process. At 715, the NFA state 's' is unmarked and added to a set 'S' of unmarked NFA states. At 720, an NFA state 's' is selected from the unmarked NFA states 'S.' At 725, epsilon transitions from the selected NFA state 's' are determined. At step 730, it is determined whether there are any epsilon transitions. If not, at 740, the selected NFA state 's' is added in the epsilon closure set. If transitions exist, then all determined NFA transitions from selected NFA state 's' are added to the set 'S' as unmarked NFA states, at step 745. Step 750 determines whether there are any unmarked NFA states left in NFA state 's'. If so, the method continues from step 720. If not, the method ends at step 755.

An example pseudocode #1 for the above referenced method (starting at step 615 of FIG. 6A) is as follows:
1. For each unmarked DFA state 'd' (column—1—in DFA STATES TABLE, table 1 above)
    1. For each alphabet 'a' in the alphabet set
        1. Set S={ }
        2. For each NFA state 'n' of 'd' (column—2—in DFA STATES TABLE, table 1 above)
            1. If 'n' has an outgoing arc to 'm' arc on 'a'
                1. S=SU {m}
        3. Se=ECLOSURE(S)
        4. Assign found to 'false'
        5. For each DFA state 'f' in the DFA STATES TABLE, table 1 above
            1. Let 'p' be the set of NFA states corresponding to DFA state 'f'
            2. If sets 'Se' and 'p' are equivalent
                1. Assign found to 'true'
                2. Go to 1.6
        6. If found is 'true'
            1. Set TRANSITION('d', 'a')='f'
        7. Else
            1. Add a new DFA state 'f' to the DFA STATES TABLE, table 1 with 'Se' as set of NFA states in COL. 2
            2. Set TRANSITION('d', 'a')='f'
    2. set 'd' as marked Disadvantages of the above referenced method are as follows: i) step 1.1.3 of the pseudocode, representing methods 700 and 600, always calculates the epsilon closure (ECLOSURE( )) because there is no history of epsilon closures stored in memory; ii) step 1.1.5.2 is very time consuming due to a set equivalency test. The time consumed by the set equivalency test depends on the number of elements in the set to be compared (i.e., the number of NFA states in the DFA state (as shown in Table 1); and iii) an entry in Table 1 cannot be deleted because the entries are required for step 1.1.5.2 to perform the set equivalency test, thereby requiring vast amounts of memory resources.

In an example embodiment of the present invention, an NFA graph is converted to an equivalent DFA graph.

Figure 8A:
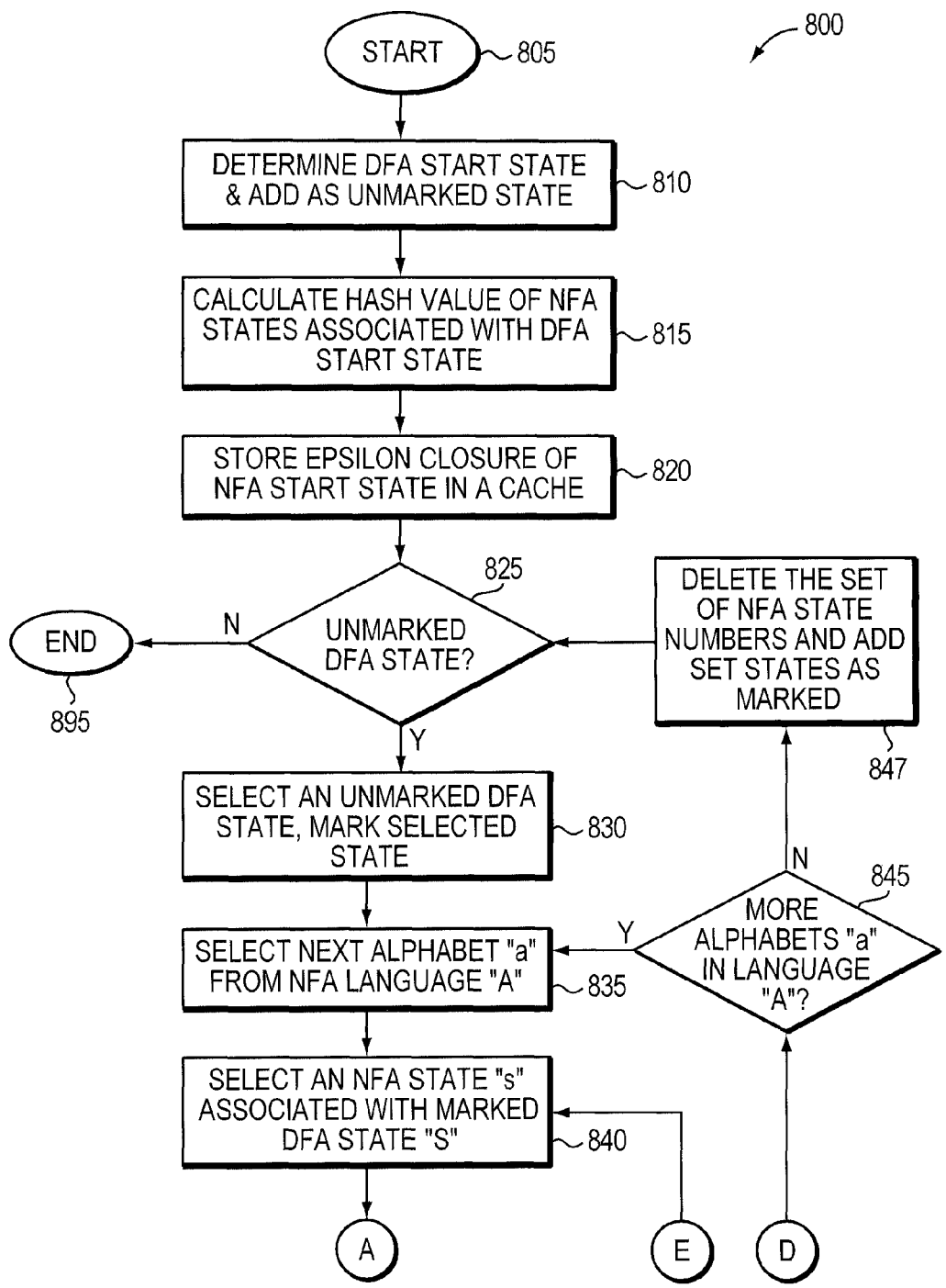
FIGS. 8A-C are flow diagrams of a method for converting an NFA graph to a DFA graph.
Figure 8B:
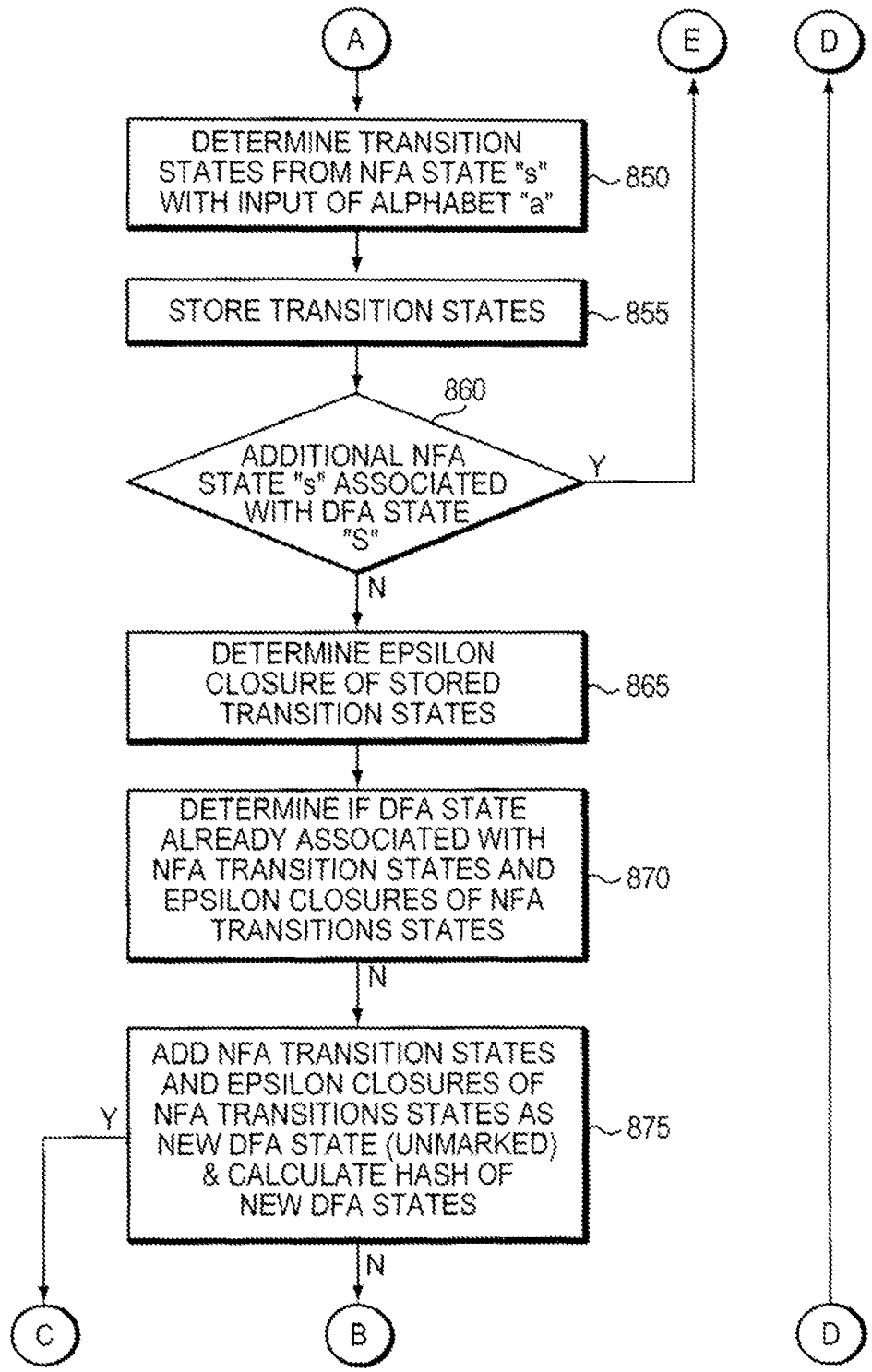
Figure 8C:
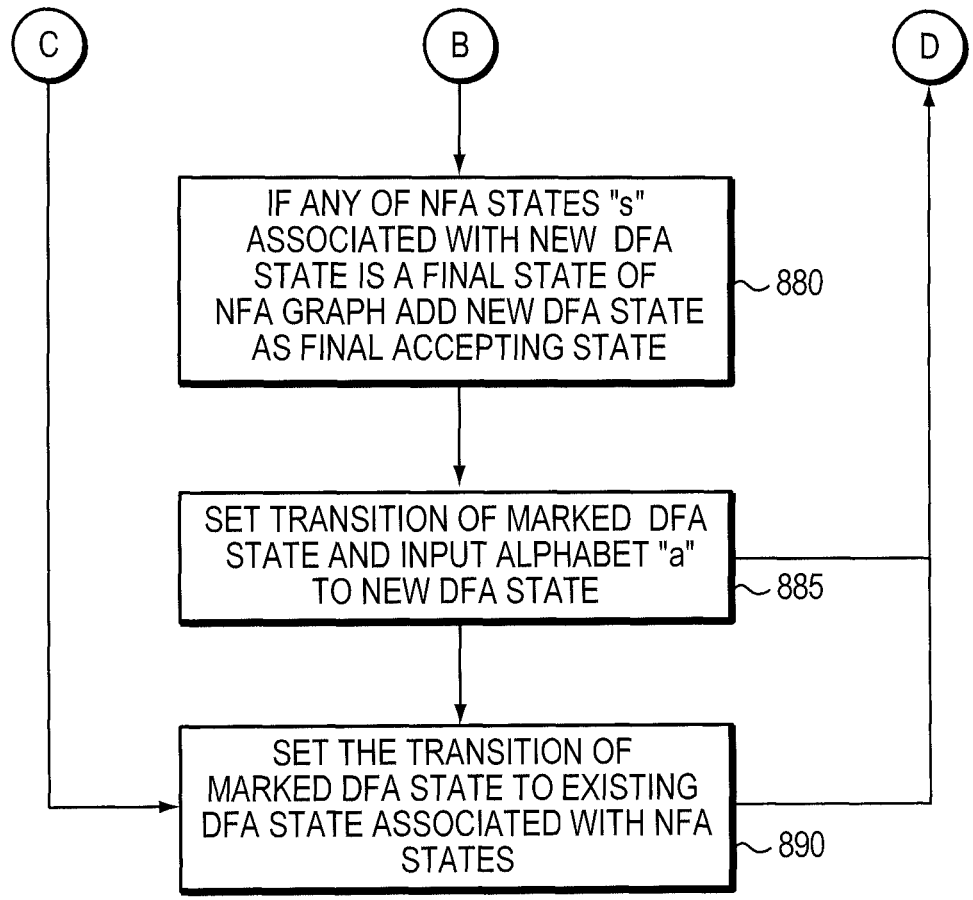

FIGS. 8A-C are flow diagrams of a method 800 for converting an NFA graph to a DFA graph as per example embodiments of the present invention. The method 800 begins at 805. At this stage, the set of DFA states "Sd" is null. At 810, a start state of the DFA is determined and added to the set of DFA states "Sd" as an unmarked state. The start state of the DFA is determined as the epsilon closure of the start state of the NFA graph. The method of determining the epsilon closure, as per example embodiments of the present invention, of an NFA state is further described below in reference to FIG. 9. At 815, a cryptographic/perfect hash value of the NFA states associated with the DFA start state is calculated and stored in a table correlating DFA states with the hash values of NFA states associated with the DFA state as shown in Table 4 below. At 820, the epsilon closure of the NFA start state is stored in an Epsilon Cache as shown in Table 5 further. The Epsilon Cache is keyed on the hash of the set of input NFA states and the data stored is the calculated Epsilon Closure of the input NFA states.

A cryptographic hash/perfect hash function is a deterministic procedure that takes an arbitrary block of data and returns a fixed-size bit string, which is the cryptographic hash value. Example cryptographic hash functions include, for example, a message-digest algorithm (MD5) or a secure hash algorithm (SHA1/SHA2). With a larger digest (e.g., 128b for MD5), chances of collision are less likely. However, a "sanity check" may be done offline to verify that there are no collisions (different data sets having the same hash value) so that a graph may be corrected if a collision occurs.

At 825, it is determined if the set of DFA states "Sd" includes an unmarked DFA state. If not, the method ends at step 895. If an unmarked DFA state of the set of DFA states "Sd" exists, at 830, unmarked state 'S' is selected and marked. At 835, an alphabet (e.g., letter) of a language 'A' recognized by the NFA graph is selected. Additionally, a data structure "St" for holding a set of NFA states is set to 'NULL'. At step 840, an NFA state 's' associated with the DFA state 'S' is selected. At 850, a transition function "TTn=(s,a)" is applied to the NFA state 's' using letter 'a' an input value. The transition function determines all NFA states reached from NFA state 's' if an input of 'a' is received. At 855, the determined NFA states are then stored in the data structure "St". At 860, it is determined if the DFA state 'S' includes additional associated NFA states. If so, the method repeats at steps 850 and 855 until all NFA states 's' of the DFA state 'S' have been processed. If all NFA states have been processed, the method continues at step 865. At 865, the Epsilon Closure of all NFA states 's' in the data structure 'St' is determined as per FIG. 9 and added to the data structure 'Se.'

At step 870, the data structure 'Se' is compared with all exiting DFA states 'S' to determine if a DFA state 'S' already includes all the NFA states 's' in data structure 'Se'. As stated above in reference to step 645 of method 600, general approaches store set of NFA states 's' associated with each DFA state 'S' in a data structure. In order to determine whether the NFA states 's' in the data structure 'Se' are already associated with a DFA state 'S,' each NFA state set 's' of data structure 'Se' must be compared with each NFA state set 's' for each DFA state 'S.' Therefore, such a comparison requires a significant amount of time and memory as shown in Table 2.

In a current embodiment, a cryptographic/perfect hash value of the NFA states in the data structure "Se" is calculated and then compared to the table correlating the number of DFA states to the hash value of their corresponding set of one or more NFA states. If a matching hash value exists, then, at step 870, it is determined that a DFA state associated with the NFA states in data structure "Se" already exists, and the method moves to step 890. At 890, the transition from DFA state 'S' with an input of alphabet 'a' is set to an existing DFA state associated with the matching hash value. The method moves to step 845, where a determination is made as to whether another alphabet 'a' exists in language 'A,' if so the method repeats from step 835. If not, the method moves to step 847. At step 847, the method deletes the set of NFA state numbers and adds the set of states as marked. The method then continues at step 825.

Run time of the operation at step 870 is captured below in reference to Table 3. Table 3 lists the storage and maintenance cost of hash matching according to example embodiments of the present invention. The comments column of Table 3 provides a description of hash matching.

TABLE 3

| Run time | Storage | Maintenance of data structure (insert of NFA state) | Comments |
|---|---|---|---|
| O(N) | O(N) | O (1) | Each set of NFA states (associated with DFA state) is replaced with its equivalent cryptographic hash. |

Table 4, as shown below, is a DFA states table correlating the DFA states numbers to the hash value of their corresponding set of one or more NFA states, as described above.

TABLE 4

| DFA STATE NUMBER | DFA STATE HASH | SET OF NFA STATE NUMBERS | Marked(m)/ Unmarked(U) |
|---|---|---|---|
| 0 | 81237912891273 | -DELETED- | M |
| 1 | 09237504823405 | -DELETED- | M |
| 2 | 23894729379237 | {4, 5, 6, 2, 0, 1} | U |
| 3 | 89345798731278 | {4, 2, 3, 7, 1, 8} | U |
| ... | ... | ... | |

Continuing with FIG. 8B, if a matching hash value does not exist at step 870, the method moves to step 875. At 875, the NFA states 's' in data structure 'Se' are added to the set of DFA states 'Sd' as a new unmarked DFA state (e.g., 'D'). Additionally, a cryptographic/perfect hash value of the NFA states 's' is calculated and the new DFA state is mapped to the hash value in table 4 discussed above. At 880, it is determined whether any of the NFA states 's' belongs to a set of final states of the NFA graph. If so, the new DFA state is determined to be a final accepting state of the DFA graph. At 885, the transition from marked DFA state 'S' with input 'a' is determined to be the new DFA state 'D.'

Figure 9:
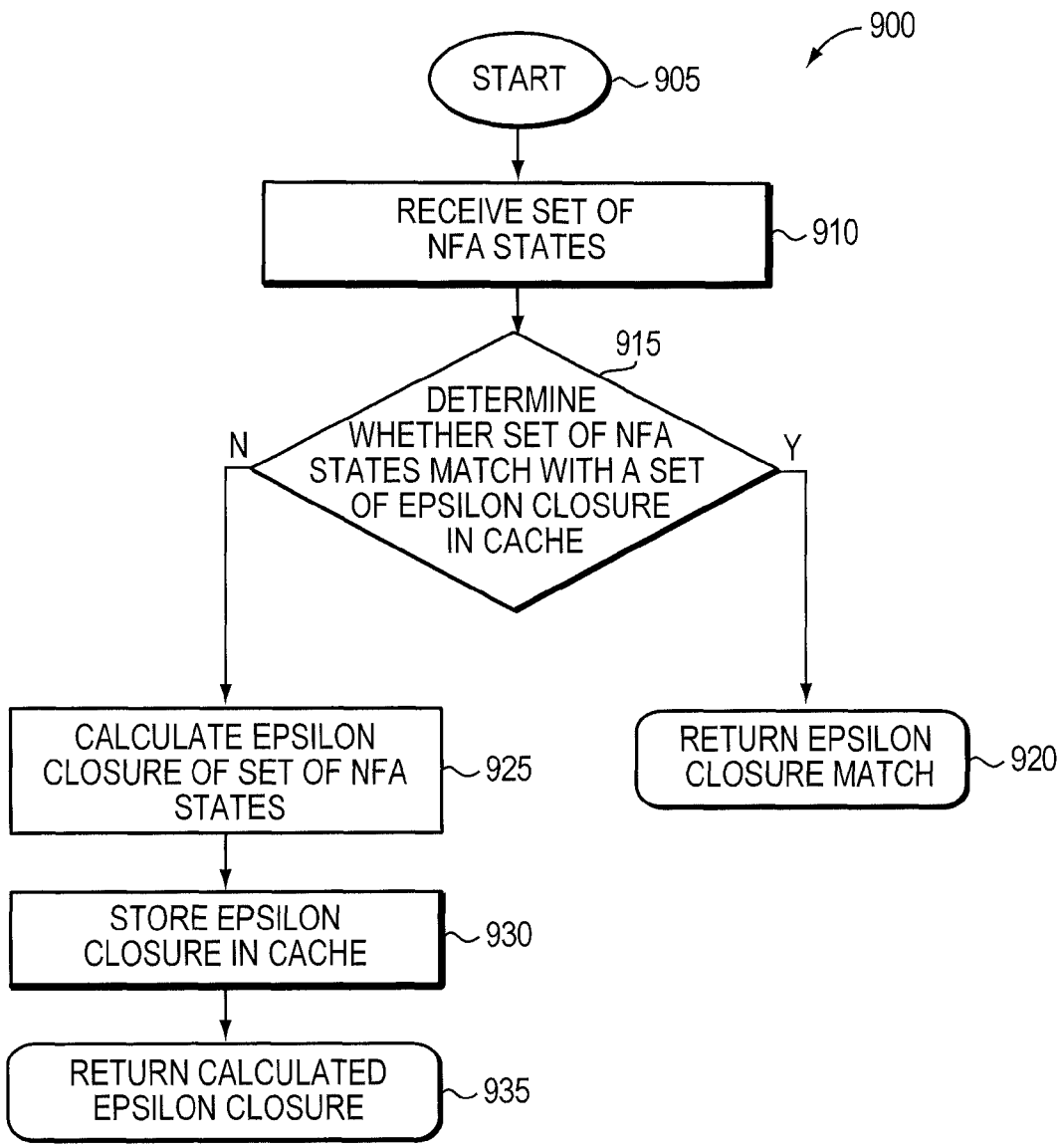
FIG. 9 is a flow diagram of a method for determining an epsilon closure for a state in an NFA graph.

FIG. 9 is a flow diagram of a method 900 for determining an epsilon closure for a set of states in an NFA graph, as per example embodiments of the present invention. The method 900 begins at step 905. At 910, an epsilon closure calculator received a set of NFA states. At 915, the set of NFA states are compared with entries within a cache to determine whether the cache contains a matching set of NFA states.

Each entry within the cache may be stored as a hash value representing a set of NFA states mapping to an epsilon closure of an input set of NFA states. The calculator calculates a hash value from the received set of NFA states and determines whether the EC Cache has a matching hash value entry associated with the set of NFA states.

Table 5, as shown below, is an epsilon closure cache table mapping a set of NFA states to its epsilon closure, as described above.

TABLE 5

| EC INPUT SET HASH | EC OUTPUT SET |
|---|---|
| 78346782346782 | {3, 4, 1, 2, 7} |
| 89237489237492 | {8, 3, 2, 5, 19} |
| ... | ... |

Continuing with FIG. 9, if a match is found, at 920, the epsilon closure is returned. However, if a match is not found, an epsilon closure for the set of received NFA states is calculated. The epsilon closure may be calculated as described above in reference to method 700 described above in reference to FIG. 7. Once the epsilon closure is calculated, at 930, the epsilon closure is stored as a new entry in the epsilon cache. At 935, the calculated epsilon closure is returned.

Method 900 allows efficient processing of epsilon closure by eliminating redundant processing. For example, method 900 only calculates an epsilon closure of a set of NFA states if the epsilon closure has not already been calculated. This eliminated the need of processing the epsilon closure for an NFA set more than once. Referring the method 600 described above in reference to FIGS. 6A-B, the method may calculate the epsilon closure of any given NFA node more than once. However, by storing previously calculated epsilon closures in a cache, method 900 eliminates the need for unnecessary processing of data.

An example pseudocode #2 for the above referenced method (starting at step 825 of FIG. 8A) is as follows:
1. For each unmarked DFA state 'd' (column—1—in DFA STATES TABLE, Table 4 above)
    1. For each alphabet 'a' in the alphabet set
        1. Set S={ }
        2. For each NFA state 'n' of 'd' (column—3—in DFA STATES TABLE, Table 4 above)
            1. If 'n' has an outgoing arc to 'm' on 'a'
                1. S=SU {m}
        3. Get the ECLOSURE 'Se' of the set 'S' as given below
            1. Calculate the Hash 'Hi' of the set 'S'
            2. For each entry 'e' in the EC_CACHE TABLE, Table 5 above
                1. Let 'He' be the hash value at entry 'e' (Column—1—in EC_CACHE TABLE above)
                2. If 'Hi' and 'He' are same
                    1. Se=EC OUTPUT SET (e), i.e, column—2—in the EC_CACHE TABLE above
                    2. Go to 1.1.4
                3. Se=ECLOSURE(S)
                4. Add a new entry in the EC_CACHE TABLE above with fields 'Hi' and 'Se'
        4. Assign found to 'false'
        5. Calculate hash 'q' of the set 'Se'
        6. For each DFA state 'f' in the DFA STATES TABLE, Table 4 above
            1. Let 'p' be the hash of NFA states of the DFA state 'f'
            2. If 'p' and 'q' are same
                1. Assign found to 'true'
                2. Go to 1.1.7
        7. If found is 'true'
            1. Set TRANSITION('d', 'a')='f'
        8. Else
            1. Add a new DFA state 'f' to the DFA STATES TABLE, Table 4 with fields 'q' and 'Se'
            2. Set TRANSITION('d', 'a')='f'
    2. Delete the set of NFA state numbers of the DFA state 'd' from the DFA STATES TABLE, Table 4 and set 'd' as marked Advantages of the above referenced method are as follows: i) step 1.1.3 avoids calculating the ECLOSURE( ) if it is already calculated; ii) Step 1.1.6.2 is a comparison of hash values, whose size is constant and takes fixed amount of time for comparison, which is better compared to a set equivalence test. The amount of time is 0(1), as shown in Table 3 above; and iii) because the set of NFA states for a DFA state are deleted after being processed, a vast quantity of the memory foot print of the compiler is saved, as shown in Table 4.

Another optimization is that, EC_CACHE may also store a direct DFA state number instead a set of NFA states corresponding to the epsilon closure set (of NFA states) so that step 870 is not required at all. For instance, if there is a hit in EC_CACHE( ), there is no need to search for an equivalent DFA node. Table 6, as shown below, is an example EC_CACHE table that stores a direct DFA state number corresponding to the epsilon closure set (of NFA states).

TABLE 6

| EC INPUT SET HASH | DFA STATE NUMBER |
|---|---|
| 78346782346782 | 13 |
| 89237489237492 | 14 |
| ... | |

Thus, processing table for step 870 becomes:

TABLE 7

| Run time | Storage | Maintenance of data structure (insert of NFA state) | Comments |
|---|---|---|---|
| O(1) or Zero processing | O(N) | O (1) | In case of hit in EC_CACHE. Since, EC_CACHE contains corresponding DFA number. |

Figure 9A:
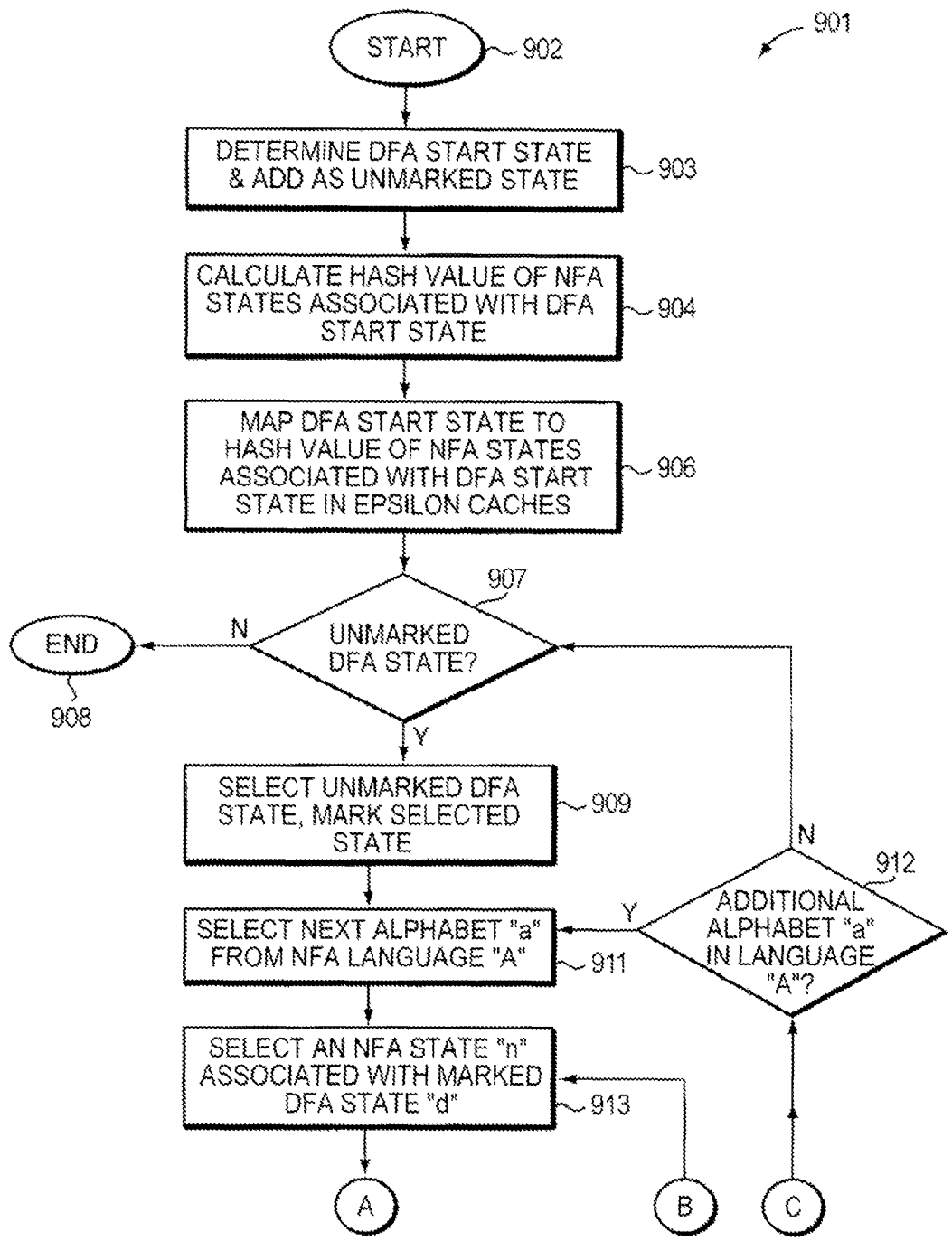
FIGS. 9A-9B are flow diagrams of a method for converting an NFA graph to a DFA graph.
Figure 9B:
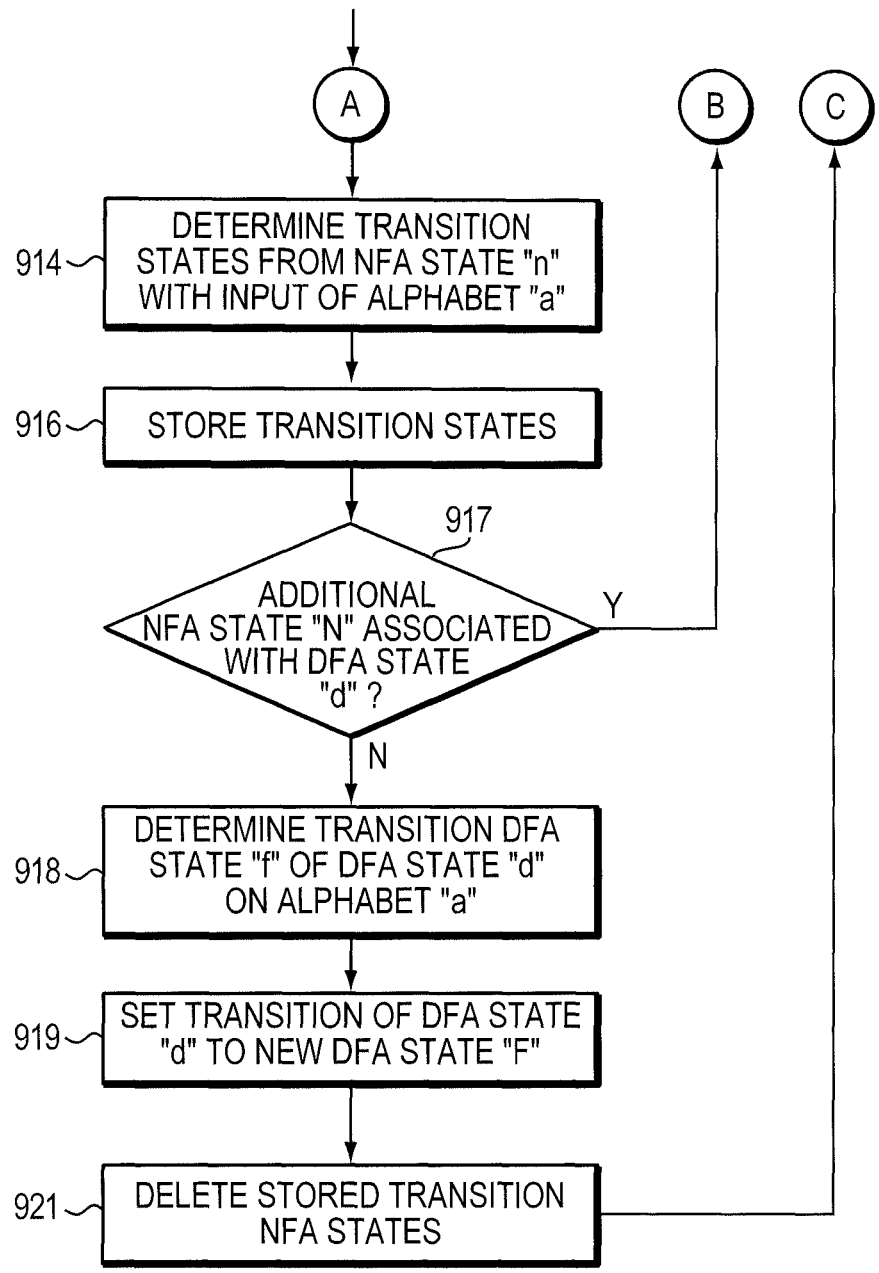

FIGS. 9A-B are flow diagrams of a method 901 for converting an NFA graph to a DFA graph as per example embodiments of the present invention. The method 901 begins at 902. At this stage, the set of DFA states "Sd" is null. At 903, a start state of the DFA is determined and added to the set of DFA states "Sd" as an unmarked state. The start state of the DFA is determined as the epsilon closure of the start state of the NFA graph. The method of determining the epsilon closure, as per example embodiments of the present invention, of an NFA state is further described below in reference to FIG. 9C. At 904, a cryptographic/perfect hash value of the NFA states associated with the DFA start state is calculated and, at 906, the mapping of the DFA start state and the cryptographic hash is stored in a table correlating DFA states with the hash values of NFA states associated with the DFA state as shown in Table 6 above.

At 907, it is determined if the set of DFA states "Sd" includes an unmarked DFA state. If not, the method ends at step 908. If an unmarked DFA state of the set of DFA states "Sd" exists, at 909, unmarked state 'd' is selected and marked. At 911, an alphabet (e.g., letter) of a language 'A' recognized by the NFA graph is selected. Additionally, a data structure "S" for holding a set of NFA states is set to 'NULL'. At step 913, an NFA state 'n' associated with the DFA state 'd' is selected. At 914, a transition function "TTn=(s,a)" is applied to the NFA state 'n' using letter 'a' an input value. The transition function determines all NFA states reached from NFA state 'n' if an input of 'a' is received. At 916, the determined NFA states are then stored in the data structure "S". At 917, it is determined if the DFA state 'd' includes additional associated NFA states. If so, the method repeats at step 913 until all NFA states 'n' of the DFA state 'd' have been processed. If all NFA states have been processed, the method continues at step 918. At 918, a transition from DFA state 'd' on alphabet 'a' is determined as per FIG. 9C. At step 919, a transition state 'f' from DFA state 'd' with an input of alphabet 'a' is set and stored in the DFA states table. At 921, the set of stored NFA transition states is deleted from the data structure 'S.'

Figure 9C:
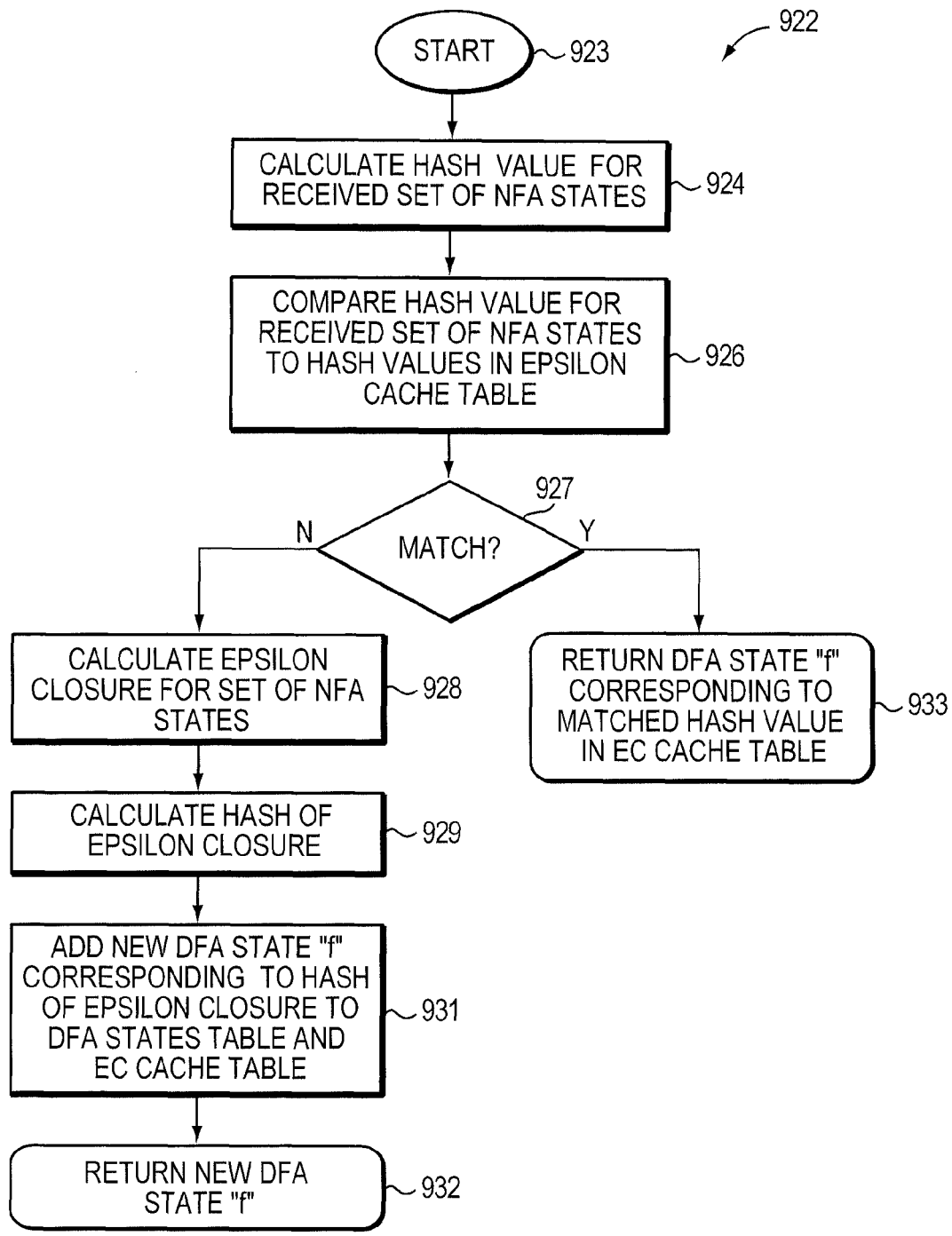
FIG. 9C is a flow diagram for determining an epsilon closure for a set of NFA states.

FIG. 9C is a flow diagram of a method 922 for determining an epsilon closure for a set of states in an NFA graph, as per example embodiments of the present invention. The method 922 begins at step 923. At 924, an epsilon closure calculator receives a set of NFA states and calculates a hash value 'Hi' for the received set of NFA states. At 926, the hash value 'Hi' is compared with hash value entries within an epsilon cache to determine whether the cache contains a match.

Each entry within the cache may be stored as a hash value representing a set of NFA states mapping to a DFA state. The calculator calculates a hash value from the received set of NFA states and determines whether the EC Cache has a matching hash value entry associated with the set of NFA states, which correlates to a DFA state.

If a match is found, at 933, the DFA state 'f' mapped to the matching hash value of the cache table is returned. However, if a match is not found, an epsilon closure for the set of received NFA states is calculated, at step 928. The epsilon closure may be calculated as described above in reference to method 700 described above in reference to FIG. 7. Once the epsilon closure is calculated, at 929, a cryptographic hash of the epsilon closure is calculated and stored as a new entry in the epsilon cache. At 931, a new DFA state 'f' corresponding to the hash value of the set of NFA states is mapped to the hash value in the EC Cache table. At 932, the new DFA state 'f' is returned.

An example pseudocode #3 for the above referenced method is as follows:
1. For each unmarked DFA state 'd' (column —1—in DFA STATES TABLE, table 4 above)
   1. For each alphabet 'a' in the alphabet set
      1. Set S={ }
      2. For each NFA state 'n' of 'd' (column—3—in DFA STATES TABLE, table 4 above)
         1. If 'n' has an outgoing arc to 'm' on 'a'
            1. S=SU {m}
      3. Get the transition DFA state 'f' of DFA state 'd' on alphabet 'a' as follows
         1. Calculate Hash 'Hi' of the set 'S'
         2. For each entry 'e' in the EC_CACHE TABLE, Table 6 above
            1. Let 'He' be the hash value at entry 'e' (Column—1—in EC_CACHE Table 6 above)
            2. If 'Hi' and 'He' are same
               1. Assign 'f' to DFA state number of entry 'e', i.e, column—2—in the EC CACHE TABLE above
               2. Go to 1.1.5
         3. Se=ECLOSURE(S)
         4. Calculate hash 'q' of the set 'Se'
         5. Assign found to 'false'
         6. For each DFA state 'g' in the DFA STATES TABLE above
            1. Let 'p' be the hash of NFA states of the DFA state 'g'
            2. If 'p' and 'q' are same
               1. Assign found to 'true' and assign 'g' to 'f'
               2. Go to 1.1.3.7
         7. If found is 'true'
            1. Go to 1.1.4
         8. Add a new unmarked DFA state 'f' in the DFA STATES TABLE using 'q' and 'Se'
      4. Add a new entry in the EC CACHE table using the hash 'Hi' and the DFA state number 'f'
      5. Set TRANSITION('d', 'a')='f'
   2. Delete the set of NFA state numbers of the DFA state 'd' from the DFA STATES
      TABLE, Table 4 above and set state as "marked"

A size of EC_CACHE may be configurable and limited, depending on a run time memory footprint allowed. If the run time memory footprint is limited, there needs to be a replacement policy. For example, the replacement policy may keep an epsilon closure (EC) of the least recently used set of NFA states or there may be no replacement at all. In the latter case, EC_CACHE only holds predetermined EC of fixed number of set of NFA states. The latter case has been found to be very useful.

Advantages of the above referenced method are as follows: i) step 1.1.3.2 avoids calculating the ECLOSURE( ) if it is already calculated; ii) storing the DFA node number in the EC_CACHE TABLE instead of the ECLOSURE set avoids the search for the DFA node, given its ECLOSURE( ), if possible (Step 1.1.6 in the previous algorithm, pseudocode #2); and iii) because the set of NFA states for a DFA state are deleted after being processed in Table 4, a vast quantity of the memory foot print of the compiler is saved.

As stated above, content searching is typically performed using a search algorithm such as, Deterministic Finite Automata (DFA) or Non-Deterministic Finite Automata (NFA) to process a regular expression. Another type of a string searching algorithm that may be implemented is an Aho-Corasick algorithm.

The Aho-Corasick algorithm may be used to create a finite state pattern machine from a set of text strings that may be used to process input payload in a single pass. For example, given a set of strings an Aho-Corasick algorithm creates a finite pattern matching machine used to process any arbitrary text string that may be received via packets in a communication network. The behavior of the created pattern matching machine is dictated by three functions: i) a goto function 'g,' ii) failure function 'f,' and iii) output function 'output.'

Figure 10:
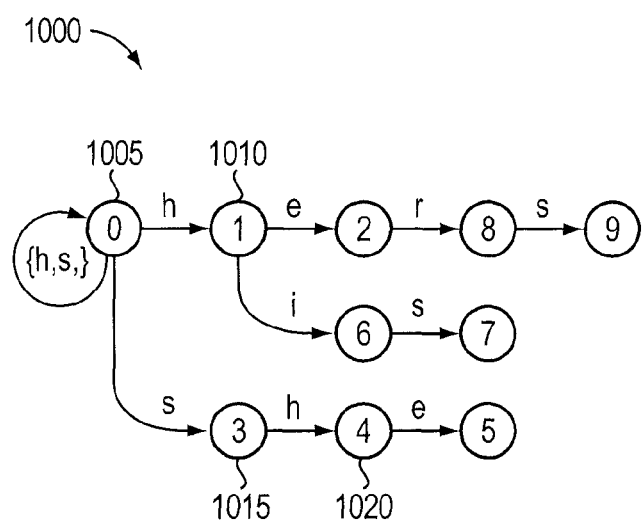
FIG. 10 illustrates a pattern matching machine for searching for example patterns "hers," "his," and "she" using an Aho-Corasick algorithm.

FIG. 10 shows a pattern matching machine 1000 for searching for patterns "hers," "his," and "she" using an Aho-Corasick algorithm. The goto function 'g' maps a pair consisting of a state and an input symbol into a state or the message 'fail'. The failure function 'f' maps a state into a state, and is consulted whenever the goto function 'g' reports fail. The output function 'output' associates a set of keywords (possibly empty) with every state.

The start state is state 0 (represented by node 1005). In any given state, if goto function "g(s, a)=t" ('s' being a current state of the finite machine, 'a' an input value, and T a transition state), then the pattern matching machine 1000 enters state T and the next symbol of an input strict becomes the current input symbol. For example, referring to FIG. 10, if in state 0 (node 1005) and an input value of 's' is received, the machine 1000 will transition to state 3 (node 1015).

However, if goto function "g(s, a)=fail" and failure function "f(s)='s'", then the machine repeats the cycle with 's' as the current state and input alphabet 'a' as the current input symbol. FIG. 11A illustrates prior art failure values for each state of the pattern matching machine 1000. FIG. 11B illustrates the output function values for states 2, 5, 7, and 9.

For example, referring to FIG. 10, an arbitrary input string "ushers" is processed by processing machine as follows:

processing or matching begins at start state 0 (represented by node 1005). On a character 'u' of the input stream the machine remains in state 0 (node 1005). On a character 's' of the input stream the machine transitions to state 3 (node 1015) and continues as follows:

on 'h'={4}
on 'e'={5}
on 'r'={8}
on 's'={9} in state 4 (node 1020), because goto function g(4, 'e')=5, and the machine 1000 enters state 5, keywords "she" and "he" are matched at the end of position four in text string "ushers" and the output function emits output(5) (as seen in FIG. 11B). In state 5 on input symbol 'r,' the machine 1000 makes two state transitions. Because g(5,r)=fail, machine 1000 enters state 2=f(5). In addition, because g(2, r)=8, machine 1000 enters state 8 and advances to the next input symbol.

Having described the example security application in which example embodiments of the present invention may be implemented and the typical processing using an Aho-Corasick machine 1000, example embodiments of the present invention are described in detail immediately below.

The Aho-Corasick machine 1000, as described above, detects the occurrence of keywords or patterns at every location of an arbitrary input string. In certain situations, a given pattern or keywords may only be significant if found in within a certain region or location of the input string. For example, an HTTP protocol request parser is interested in the keyword "GET" only if it occurs at the beginning of the request and is not interested in any other "GET" after that. Such a pattern may be referred to as an anchored pattern.

Embodiments of the present invention enable the creation of an Aho-Corasick pattern matching machine that recognizes both unanchored patterns and anchored patterns. As described above, pattern matching machine 1000 recognizes unanchored patterns "hers," "his," and "she" using an Aho-Corasick algorithm. By modifying the Aho-Corasick algorithm, a pattern matching machine may be created to recognize additional anchored patterns "help" and "shell."

Given a set of patterns, anchored patterns must be distinguished from unanchored patterns. The anchored patterns may be tagged with a macro specifying that they are anchored. For example, '{@0}' may be appended to the beginning of a pattern to specify the pattern is an anchored pattern. Thus, given a list of patterns "he, she, his, hers, {@0} help, and {@0} shell" a compiler is able to recognize that keywords "help" and "shell" are anchored patterns.

Figure 12:
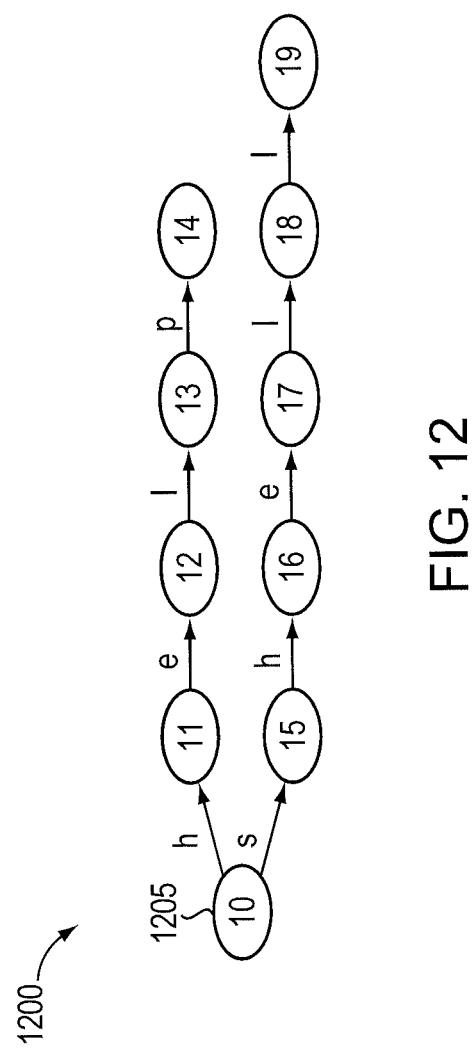
FIG. 12 illustrates a state tree for example anchored patterns "help" and "shell."

Once a list of keywords/patterns is received by a compiler, the compiler is able to differentiate the unanchored patterns from the anchored patterns. The compiler then creates a separate state tree for all anchored patterns and a separate state tree (machine 1000 as illustrated in FIG. 10) for un-anchored patterns using the goto function 'g' as described above. FIG. 12 illustrates a state tree 1200 for anchored patterns "help" and "shell." FIG. 12A illustrates failure values for each state of the state tree 1200 as per prior art (i.e., assuming these patterns were compiled as unanchored patterns). FIG. 12B illustrates the output function values for states 14 and 19 of state tree 1200.

Once the state tree for the anchored patterns and unanchored patterns are created, the compiler calculates the failure function 'f' for both state trees. For the state tree representing the unanchored patterns, the compiler implements the failure functions as described above in reference to FIGS. 10 and 11A. As per example embodiment of present invention, the failure function of anchored patterns is built as per following rules:

a) The failure of the root node of the anchored tree is set equal to the root node of the unanchored state tree. Thus, if none of the anchored patterns are matched, the unanchored patterns are tracked. For example, the failure of state 10 (node 1205) is set equal to start state 0 (node 1005 of FIG. 10).

b) Once the failure of the start state of the anchored tree is determined, the failure 'f' of each state of the anchored tree is determined such that partial matches of unanchored keywords with the anchored keywords are also tracked using the goto function 'g' as shown in FIG. 13A.

Output functions of anchored patterns are calculated separately but maintain overlap with un-anchored patterns in view, as shown in FIG. 13B.

After this, as per example embodiments of present invention, the root node of the anchored state tree is set as the root node of the final state tree (the combination of the anchored and unanchored state tree).

Now, anchored state tree and unanchored state tree have effectively merged into a single state tree.

For example, referring to FIGS. 10, 11A-B, 12 and 13A-B, an arbitrary input string "ushers" is processed by processing machine as follows:

processing or matching begins at start state 10 (represented by node 1205). On a character 'u' of the input stream the machine transitions to state 0 (node 1005 in FIG. 10) as per failure function as shown in FIG. 13A and processes 'u' again at node 0 (1005) and the machine stays at node 0 (1005). On a character 's' of the input stream the machine transitions to state 3 (node 1015) and continues as follows:
on 'h'={4}
on 'e'={5}
on 'r'={8}
on 's'={9} in state 4 (node 1020), because goto function g(4, 'e')=5, and the machine 1000 enters state 5, keywords "she" and "he" are matched at the end of position four in text string "ushers" and the output function emits output(5) (as seen in FIG. 11B). In state 5 on input symbol 'r,' the machine 1000 transitions to state 8. In state 8 on input symbol 's,' the machine 1000 transitions to state 9, keyword "hers" is matched and the output function emits output(9) (as seen in FIG. 11B).

In another example, referring to FIGS. 10, 11A-B, 12 and 13A-B, an arbitrary input string "shell" is processed by processing machine as follows:

processing or matching begins at start state 10 (represented by node 1205). On a character 's' of the input stream the machine transitions to state 15 (FIG. 12) continues as follows:
on 'h'={16}
on 'e'={17}
on 'l'={18}
on 'l'={19} in state 16 (FIG. 12), because goto function g(16, 'e')=17, and the machine 1200 enters state 17, keywords "she" and "he" are matched at the end of position three in text string "shell" and the output function emits output(17) (as seen in FIG. 13B). In state 17 on input symbol 'l,' the machine 1200 transitions to state 18. In state 18 on input symbol 'l,' the machine 1200 transitions to state 19, keyword "shell" is matched as an anchored pattern and the output function emits output(19) (as seen in FIG. 13B).

As stated above, the input to a DFA or NFA state machine is typically a string of (8-bit) bytes, that is, the alphabet is a single byte (one character or symbol). Thus, the size of the entire alphabet set may be 256. Further, each byte in the input stream results in a transition from one state to another state. However, not many patterns, strings, or regular expressions use the entire alphabet set. Most patterns use a small subset of the alphabet set which may be referred herein as an "active character" set. For example, only printable ASCII letters (e.g., a-z, A-Z, 0-9, and some symbols) are used.

Embodiments of the present invention compress NFA and DFA graphs to recognize only the "active character" set. As per one example embodiment of present invention, PSEUDOCODE #1, #2 & #3 processes alphabets only out of "active character" set during step 1.1 for each PSEUDO-CODE.

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
   in a processor:
   building an unanchored state graph for unanchored patterns of a plurality of given patterns, the unanchored state graph including nodes representing a state of the unanchored state graph;
   building a separate anchored state graph for given patterns, of the plurality of given patterns, marked as anchored patterns, the anchored state graph including nodes representing a state of the anchored state graph;
   for each node of the anchored state graph, determining a failure value equivalent to a node representing a state in an unanchored state graph representing unanchored patterns of the plurality of given patterns; and
   including a failure value of a root node of the anchored state graph, the failure value being equivalent to a root node of the unanchored state graph.

2. The method of claim 1, wherein the anchored state graph includes a root node that is set as a start node for processing anchored and unanchored patterns in an input payload.

3. The method of claim 1, further comprising marking the given patterns, of the plurality of given patterns, as the anchored patterns.

4. The method of claim 3, wherein marking includes adding a reference indicating a location within an input of a string of text to begin searching for the respective anchored pattern.

5. A method comprising:
   in a processor:
   building an unanchored state graph for unanchored patterns of a plurality of given patterns, the unanchored state graph including nodes representing a state of the unanchored state graph;
   building a separate anchored state graph for given patterns, of the plurality of given patterns, marked as anchored patterns, the anchored state graph including nodes representing a state of the anchored state graph;
   for each node of the anchored state graph, determining a failure value equivalent to a node representing a state in an unanchored state graph representing unanchored patterns of the plurality of given patterns;
   wherein each node of the anchored state graph includes an output function, the output function of each node is calculated as a function of both the anchored patterns and unanchored patterns.

6. The method of claim 5, further comprising marking the given patterns, of the plurality of given patterns, as the anchored patterns.

7. A method comprising:
   in a processor:
   building an unanchored state graph for unanchored patterns of a plurality of given patterns, the unanchored state graph including nodes representing a state of the unanchored state graph;
   building a separate anchored state graph for given patterns, of the plurality of given patterns, marked as anchored patterns, the anchored state graph including nodes representing a state of the anchored state graph;
   for each node of the anchored state graph, determining a failure value equivalent to a node representing a state in an unanchored state graph representing unanchored patterns of the plurality of given patterns;
   wherein building the anchored state graph and building the separate unanchored state graph includes determining a number of states and transitions from one state to another.

8. The method of claim 7, further comprising marking the given patterns, of the plurality of given patterns, as the anchored patterns.

9. A method comprising:
   in a processor:
   building an unanchored state graph for unanchored patterns of a plurality of given patterns, the unanchored state graph including nodes representing a state of the unanchored state graph;
   building a separate anchored state graph for given patterns of the plurality of given patterns, marked as anchored patterns, the anchored state graph including nodes representing a state of the anchored state graph;
   for each node of the anchored state graph, determining a failure value equivalent to a node representing a state in an unanchored state graph representing unanchored patterns of the plurality of given patterns;
   upon receiving an input string of text, processing the input string of text through the anchored state graph; and
   transitioning processing of the input string of text to a node of the unanchored state graph if a character of the input string of text results in one of the determined failure values on one of the nodes of the anchored state graph, the resulting failure value determining the node of the unanchored state graph to transition processing.

10. The method of claim 9, further comprising marking the given patterns, of the plurality of given patterns, as the anchored patterns.

11. An apparatus comprising a processor configured to implement a compiler, the compiler configured to:
    build an unanchored state graph for unanchored patterns of a plurality of given patterns, the unanchored state graph including nodes representing a state of the unanchored state graph;
    build a separate anchored state graph for given patterns, of the plurality of given patterns, marked as anchored patterns, the anchored state graph including nodes representing a state of the anchored state graph;
    for each node of the anchored state graph, determine a failure value equivalent to a node representing a state in an unanchored state graph representing unanchored patterns of the plurality of given patterns; and
    determine a failure value of a root node of the anchored state graph, the failure value being equivalent to a root node of the unanchored state graph.

12. The apparatus of claim 11, wherein the compiler is further configured to mark the given patterns, of the plurality of given patterns, as the anchored patterns.

13. The apparatus of claim 11, wherein the anchored state graph includes a root node that is set as a start node for processing anchored and unanchored patterns in an input payload.

14. An apparatus comprising a processor configured to implement a compiler, the compiler configured to:
   build an unanchored state graph for unanchored patterns of a plurality of given patterns, the unanchored state graph including nodes representing a state of the unanchored state graph;
   build a separate anchored state graph for given patterns, of the plurality of given patterns, marked as anchored patterns, the anchored state graph including nodes representing a state of the anchored state graph;
   for each node of the anchored state graph, determine a failure value equivalent to a node representing a state in an unanchored state graph representing unanchored patterns of the plurality of given patterns;
   wherein each node of the anchored state graph includes an output function, the output function of each node is calculated as a function of both the anchored patterns and unanchored patterns.

15. The apparatus of claim 14, wherein the compiler is further configured to mark the given patterns, of the plurality of given patterns, as the anchored patterns.

16. The apparatus of claim 14, wherein the compiler is further configured to mark the given patterns by adding a reference indicating a location within an input of a string of text to begin searching for the respective anchored pattern.

17. An apparatus comprising a processor configured to implement a compiler, the compiler configured to:
   build an unanchored state graph for unanchored patterns of a plurality of given patterns, the unanchored state graph including nodes representing a state of the unanchored state graph;
   build a separate anchored state graph for given patterns, of the plurality of given patterns, marked as anchored patterns, the anchored state graph including nodes representing a state of the anchored state graph;
   for each node of the anchored state graph, determine a failure value equivalent to a node representing a state in an unanchored state graph representing unanchored patterns of the plurality of given patterns;
   wherein the compiler is further configured to build the anchored state graph and the separate unanchored state graph by determining a number of states and transitions from one state to another.

18. The apparatus of claim 17, wherein the compiler is further configured to mark the given patterns, of the plurality of given patterns, as the anchored patterns.

19. An apparatus comprising a processor configured to implement a compiler, the compiler configured to:
   build an unanchored state graph for unanchored patterns of a plurality of given patterns, the unanchored state graph including nodes representing a state of the unanchored state graph;
   build a separate anchored state graph for given patterns, of the plurality of given patterns, marked as anchored patterns, the anchored state graph including nodes representing a state of the anchored state graph;
   for each node of the anchored state graph, determine a failure value equivalent to a node representing a state in an unanchored state graph representing unanchored patterns of the plurality of given patterns;
   wherein the compiler is further configured to:
   upon receiving an input string of text, process the input string of text through the anchored state graph; and
   transition processing of the input string of text to a node of the unanchored state graph if a character of the input string of text results in one of the determined failure values of one of the nodes of the anchored state graph, the resulting failure value determining the node of the unanchored state graph to transition processing.

20. The apparatus of claim 19, wherein the compiler is further configured to mark the given patterns, of the plurality of given patterns, as the anchored patterns.

21. A method comprising:
   in a processor:
   building an unanchored state graph for unanchored patterns of a plurality of given patterns, the unanchored state graph including nodes representing a state of the unanchored state graph;
   building a separate anchored state graph for given patterns, of the plurality of given patterns, marked as anchored patterns, the anchored state graph including nodes representing a state of the anchored state graph; and
   for each node of the anchored state graph, determining a failure value equivalent to a node representing a state in an unanchored state graph representing unanchored patterns of the plurality of given patterns, wherein the failure value equivalent to the root node of the unanchored state graph enables tracking of the unanchored patterns of the plurality of given patterns in an event none of the anchored patterns of the plurality of given patterns are matched.

22. The method of claim 21, further comprising marking the given patterns, of the plurality of given patterns, as the anchored patterns.

* * * * *